(12) United States Patent  (10) Patent No.: US 7,711,610 B2
Iwaki et al.  (45) Date of Patent: May 4, 2010

(54) PERSONAL COLOR ORDERING SYSTEM AND PERSONAL COLOR ORDERING METHOD

(75) Inventors: Michio Iwaki, Tokyo (JP); Yasuo Goto, Tokyo (JP); Masakatsu Komiya, Tokyo (JP); Yumi Tokunaga, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 1366 days.

(21) Appl. No.: 10/332,285

(22) PCT Filed: Jul. 6, 2001

(86) PCT No.: PCT/JP01/05905

§ 371 (c)(1),
(2), (4) Date: Jan. 7, 2003

(87) PCT Pub. No.: WO02/08983

PCT Pub. Date: Jan. 31, 2002

(65) Prior Publication Data

US 2003/0149504 A1    Aug. 7, 2003

(30) Foreign Application Priority Data

Jul. 19, 2000    (JP) ............................. 2000-218388

(51) Int. Cl.
*G06F 17/30* (2006.01)
(52) U.S. Cl. ............................. 705/27; 705/26; 424/63; 424/64; 424/401
(58) Field of Classification Search .................... 705/27
See application file for complete search history.

(56) References Cited

U.S. PATENT DOCUMENTS 4,931,929 A    6/1990    Sherman (Continued)

FOREIGN PATENT DOCUMENTS

JP    04-281555    10/1992

(Continued)

OTHER PUBLICATIONS

Spethmann, Betsy. Beauty Treatments. Promo, Aug. 2000. vol. 13, No. 9, p. 33+.*

(Continued)

*Primary Examiner*—F. Zeender
*Assistant Examiner*—Fawaad Haider
(74) *Attorney, Agent, or Firm*—Ladas & Parry LLP

(57) ABSTRACT

The present invention relates to a personal color ordering system and a personal color ordering method for custom-making a commodity of a color that a customer designates via a communication network, and is a cosmetic manufacturing system manufacturing a cosmetic according to information transmitted from a terminal via the Internet to a server; by providing a color database relating color data used for manufacturing the cosmetic and color specifying information for specifying the color desired by the customer, retrieving the color data desired by the customer by referring to the color database according to the color specifying information input from the terminal, transmitting this retrieved color data to a commodity manufacturing apparatus, and manufacturing the cosmetic desired by the customer, the commodity of the color desired by the purchaser (the customer) is custom-made easily in a short time.

6 Claims, 22 Drawing Sheets

U.S. PATENT DOCUMENTS 5,785,960 A 7/1998 Rigg et al.
6,246,479 B1 * 6/2001 Jung et al. .................. 356/419

FOREIGN PATENT DOCUMENTS

| JP | 4-281555 | 10/1992 |
|---|---|---|
| JP | 8-63582 | 3/1996 |
| JP | 9-171450 | 6/1997 |
| JP | 10-83421 | 3/1998 |
| JP | 10-137034 | 5/1998 |
| JP | 11-120336 | 4/1999 |
| JP | 2000-11145 | 1/2000 |
| WO | 98/30189 A2 | 7/1998 |

OTHER PUBLICATIONS

Tsua Gutome, Life With Internet, Tsuushin Seikatsu-hen (9), No. 18, Internet magazine No. 18, Kabushiki Kaisha Impress, (Japan), Jul. 1, 1996, p. 230.

European Search Report: 01945812.4-2211 / 1313046 PCT/JP0105905.

* cited by examiner

FIG.4

COLOR SELECTING METHOD DECISION

HOW DO YOU DECIDE
YOUR DESIRED COLOR?
PLEASE CHOOSE FROM BELOW.

IDENTIFICATION
DATA RETRIEVAL

DIRECT COLOR INPUT

QUESTIONNAIRE

COUNSELING

IDENTIFICATION DATA INPUT     _ ☐ X

PLEASE ENTER PRODUCT INFORMATION
OF YOUR DESIRED COLOR
(ONLY THAT YOU MAY KNOW).

1 PLEASE ENTER
   MANUFACTURE TYPE NUMBER

[           ]

2 PRODUCT OF WHEN?

ABOUT [      ]
   A.D.

3 PLEASE ENTER MANUFACTURER

[           ]

4 DO YOU KNOW A MODEL
   WHO APPEARED IN COMMERCIAL?

QUESTIONNAIRE INPUT

EACH COLOR PRESENTED BELOW IS A COLOR LIKELY TO BE IN FASHION THIS YEAR.

No.1
No.2
No.3
No.4
No.5
No.6

PLEASE VOTE FOR YOUR FAVORITE COLOR.

COUNSELING

PLEASE INFORM US OF CONDITIONS OF YOUR SKIN.

1. HOW BRIGHT IS YOUR SKIN?

○ WHITE    ○ ORDINARY    ○ BLACK

2. HOW DO YOU LIKE YOUR SKIN?

○ REDDISH    ○ ORDINARY    ○ YELLOWISH

3. HOW IS YOUR SKIN CONDITION?
   (SPOTS, FRECKLES, TROUBLES)

○ PRESENT    ○ ABSENT

FIG.18
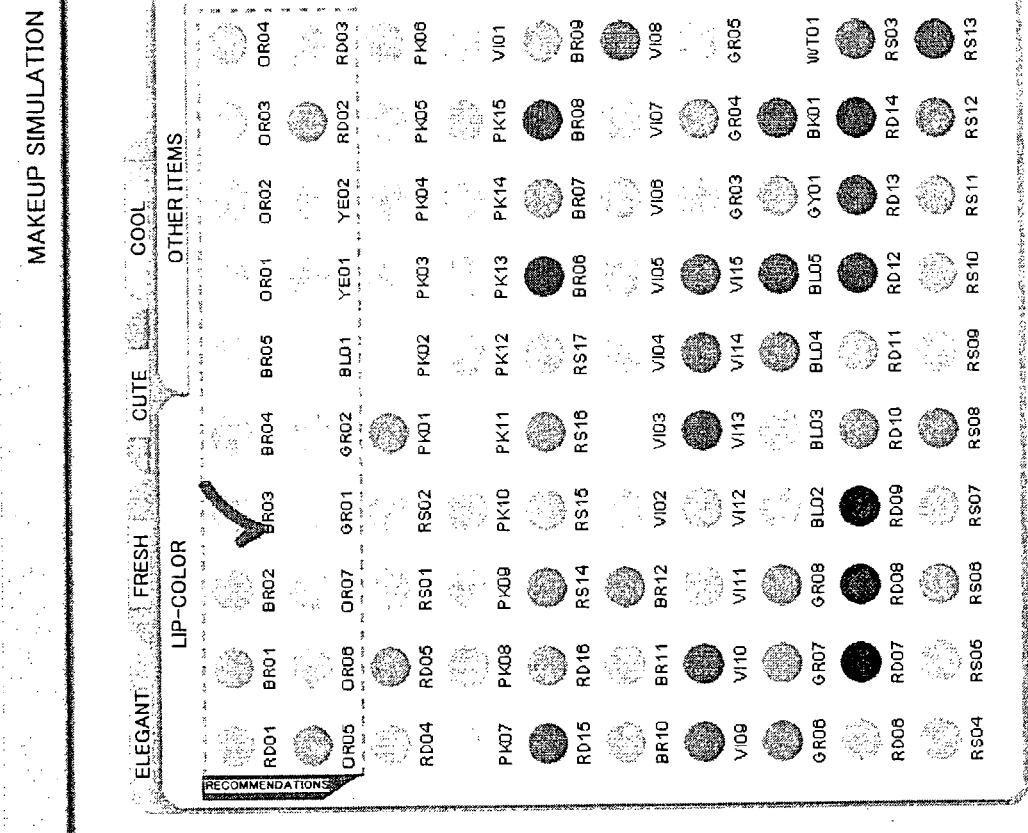
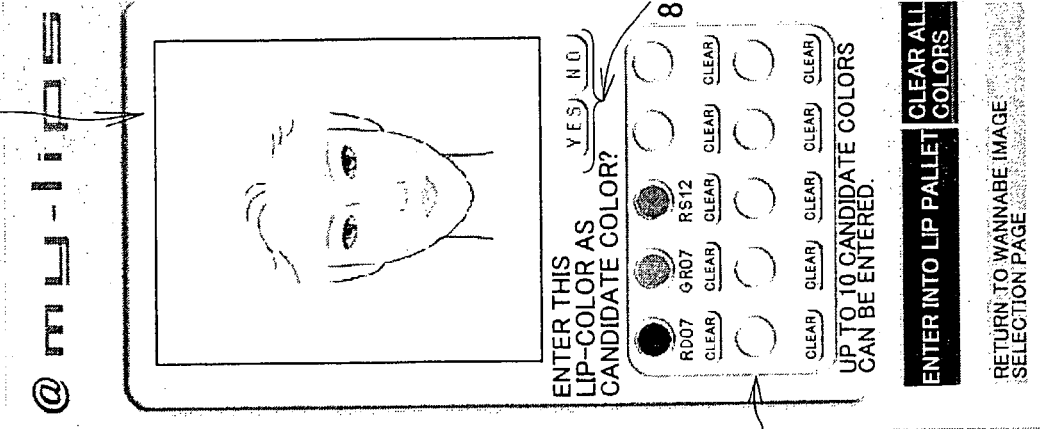

FIG.22

ORDER SHEET
(PLEASE BE SURE TO FILL IN SPACES MARKED WITH ☆)

@my-lips

● PLEASE GIVE ORIGINAL BRAND NAME TO MS.○○○○'S LIP PALLET.
(E.G., YOUR NAME, WHAT YOU IMAGED WHEN YOU SELECTED THE COLORS, ETC...)

— 92

(UP TO 10 FULL-SIZE CHARACTERS, UP TO 20 HALF-SIZE CHARACTERS)

● COLORS MS.○○○○ SELECTED (FROM LEFT IN THE PALLET)
RD04  RD07  RS04

● YOUR ADDRESS

〒 ☆ *\*-\*\*\*\*\*
PREFECTURE ☆ ×××
CITY/WARD/COUNTY ×××
TOWN/VILLAGE & LOT NUMBER ☆ ××××-\*-\*
APARTMENT NAME & ROOM NUMBER

— 93

ORDER — 94

PERSONAL COLOR ORDERING SYSTEM AND PERSONAL COLOR ORDERING METHOD

TECHNICAL FIELD

The present invention relates to a personal color ordering system and a personal color ordering method, and more particularly, to a personal color ordering system and a personal color ordering method for custom-making a commodity of a color designated by a user via a communication network.

BACKGROUND ART

In general, methods for manufacturing a commodity are classified largely into two. One of the methods is mass-producing commodities, and the other is producing commodities in small quantities. Hereinbelow, a description will be given of each of these methods by taking a cosmetic as an example of a commodity.

The method of mass-producing cosmetics is manufacturing cosmetics in a cosmetic manufacturing factory by using various large-size apparatuses for manufacturing cosmetics. Cosmetics sold in general are manufactured by this manufacturing method.

On the other hand, the method of producing cosmetics in small quantities is a method used primarily upon making a cosmetic on an experimental basis in a laboratory, etc. In a case of this small-lot production, cosmetics in as small numbers as several to several tens are manufactured; therefore, large-size apparatuses are not used, and a cosmetic manufacturing process has been performed mostly by hand.

However, according to the above-mentioned method of mass-producing cosmetics (commodities), although a large quantity of cosmetics can be manufactured in a short time, it is impossible to set colors of the manufactured cosmetics individually.

In contrast, preferences of cosmetics purchasers (users) have been diversified recently, and the purchasers desire various colors of cosmetics. However, since it is impossible to individually set colors of cosmetics according to the method of mass-producing cosmetics as mentioned above, there has been a problem of failing to meet the purchasers' needs.

On the other hand, in the method of producing cosmetics suiting purchaser's needs in small quantities (so to speak, custom-making), since the cosmetic manufacturing process is performed mostly by hand, there is a freedom in color setting upon weighing; therefore, it is possible to manufacture a cosmetic of any color. However, the method of performing the cosmetic manufacturing process by hand has involved a problem of taking a long time to manufacture a cosmetic, and thus being not suitable to a normal sales style.

Additionally, there is conventionally a problem that when a cosmetics purchaser designates a color to be purchased, there is no effective means for characterizing this color.

DISCLOSURE OF INVENTION

It is a general object of the present invention to provide a personal color ordering system and a personal color ordering method which eliminate the above-mentioned problems of conventional technologies.

A more specific object of the present invention is to realize a personal color ordering system and a personal color ordering method which are capable of custom-making a commodity of a color desired by a purchaser easily in a short time.

In order to achieve this object, the present invention, which is a personal color ordering system manufacturing a commodity of a color desired by a customer according to information transmitted from a terminal via a communication network to a server, is characterized by comprising a color database relating and storing color data used for manufacturing the foregoing commodity and color specifying information for specifying the foregoing color desired by the foregoing customer, color retrieving means for retrieving the color data desired by the foregoing customer by referring to the foregoing color database according to the foregoing color specifying information input from the foregoing terminal, and a commodity manufacturing apparatus manufacturing the commodity according to the foregoing color data retrieved by the foregoing color retrieving means.

According to the above-mentioned invention, the color database provided in the server relates and stores color data for manufacturing a commodity and color specifying information for specifying a color desired by a customer. Here, the color specifying information is data based on which to retrieve the color desired by the customer, and as a specific example, is a type number of a commodity sold in the past, etc.

The customer inputs this color specifying information by the terminal. This color specifying information is transmitted to the server via the communication network. The server comprises the color retrieving means, and this color retrieving means retrieves color data desired by the customer by referring to the color database according to the color specifying information transmitted from the terminal. The commodity manufacturing apparatus manufactures a commodity according to the color data retrieved by the color retrieving means.

Thus, the customer can specify a desired color by inputting the color specifying information without directly inputting the desired color. Additionally, it becomes possible to manufacture a commodity desired by a customer on a customer-by-customer basis so as to cope with diversification of customers' purchasing preferences.

Additionally, in the above-mentioned invention, the present invention is characterized in that the foregoing color specifying information is commodity identification data specifying an existing commodity.

According to the above-mentioned invention, a customer can purchase a commodity of a desired color by inputting the commodity identification data specifying an existing commodity, as the color specifying information. Here, the commodity identification data is a type number of a commodity, etc. Thereby, when there is a request from a customer for purchasing a commodity that the customer purchased in the past and experienced an excellent usability which is not sold at present, it becomes possible to purchase a commodity of the same color as this even though the commodity is not sold at present, provided that the customer knows the type number of the commodity.

Additionally, in the above-mentioned invention, the present invention is characterized in that the foregoing color specifying information is skin information data of the customer.

According to the above-mentioned invention, using the skin information data of a customer as the color specifying information enables a detection of color data most suitable to the face or the skin of the customer. Here, the skin information data specifically means a contour of the face, a color of the skin, and a condition of the skin, etc. of the customer.

In the present invention, skin information data and color data of a commodity are related and stored in the color database; therefore, it becomes possible to select a commodity of a color most suitable to skin information data input from a customer and present this to the customer. Accordingly, the customer can purchase the commodity of the customer's own most suitable to the face or the skin of the customer.

Additionally, in order to achieve the above-mentioned object, the present invention, which is a personal color ordering system manufacturing a commodity of a color desired by a customer according to information transmitted from a terminal via a communication network to a server, is characterized by comprising color inputting means provided in the foregoing terminal for directly inputting color information desired by the customer, a color database in which color data used for manufacturing the foregoing commodity is stored, color retrieving means for retrieving the color data desired by the foregoing customer by referring to the foregoing color database according to the direct input color information directly input from the foregoing color inputting means, and a commodity manufacturing apparatus manufacturing the commodity according to the foregoing color data retrieved by the foregoing color retrieving means.

According to the above-mentioned invention, since the terminal is provided with the color inputting means, the customer can directly input desired color information by using the color inputting means. When this directly input color information is transmitted to the server, the color retrieving means provided in the server retrieves color data identical or most similar to the color information directly input by the customer, by referring to the color database according to this color information. The color data retrieved by the color retrieving means is presented to the commodity manufacturing apparatus, whereby a commodity having the retrieved color is manufactured.

Thus, the customer can input color information from any object (e.g., a magazine or a photograph) which can be input by the color inputting means; therefore, it becomes possible to meet diversified needs of customers for colors.

Additionally, in order to achieve the above-mentioned object, the present invention, which is a personal color ordering system manufacturing a commodity of a color desired by a customer according to information transmitted from a terminal via a communication network to a server, is characterized by comprising a color database storing a plurality of color information items selected beforehand on the part of the server, selected-color displaying means for causing the plurality of the foregoing color information items selected on the part of the server to be displayed on the foregoing terminal, counting means for counting popular colors according to selected-color information selected from among the plurality of the foregoing color information items displayed on the foregoing terminal and input from the foregoing terminal by the foregoing customer, the plurality of the foregoing color information items being selected on the part of the server, so as to store a result of the counting in the foregoing color database and to cause the result of the counting to be displayed on the foregoing terminal, and a commodity manufacturing apparatus manufacturing the commodity according to color data input from the foregoing terminal.

In the above-mentioned invention, a plurality of color information items selected beforehand on the part of the server are stored in the color database. This color information item stored in the color database is a color expected to be in fashion of the current year, for example.

The counting means provided in the server causes the plurality of these color information items stored in the color database to be displayed on the terminal, and conducts a questionnaire causing the customer to select a favorite color. A color information item selected by the customer is transmitted to the counting means via the terminal, wherein a counting process of input color information items is performed. The counting process here is a so-called popularity vote process (a popularity vote) for deciding which is the most popular among the plurality of the colors stored in the color database, for example. A counting process result counted by this counting means is displayed on the terminal. Thus, it becomes possible for a customer to select a color of a commodity by referring to the counting process result.

Additionally, in the above-mentioned invention, the present invention is characterized in that the foregoing commodity is a cosmetic.

Additionally, in order to achieve the above-mentioned object, the present invention, which is a personal color ordering method for manufacturing a commodity of a color desired by a customer according to information transmitted from a terminal via a communication network to a server, is characterized by relating color data used for manufacturing the foregoing commodity and color specifying information for specifying the foregoing color desired by the foregoing customer, and storing the color data and the color specifying information in a color database, retrieving the color data desired by the foregoing customer by referring to the foregoing color database according to the foregoing color specifying information input from the foregoing terminal, and manufacturing the commodity according to the retrieved color data.

Additionally, in order to achieve the above-mentioned object, the present invention, which is a personal color ordering method for manufacturing a commodity of a color desired by a customer according to information transmitted from a terminal via a communication network to a server, is characterized by providing the foregoing terminal with color inputting means for directly inputting color information, and storing color data used for manufacturing the foregoing commodity in a color database, retrieving the color data desired by the foregoing customer by referring to the foregoing color database according to the direct input color information directly input upon directly inputting the desired color information by using the foregoing color inputting means, and manufacturing the commodity according to the retrieved color data.

Additionally, in order to achieve the above-mentioned object, the present invention, which is a personal color ordering method for manufacturing a commodity of a color desired by a customer according to information transmitted from a terminal via a communication network to a server, is characterized by storing a plurality of color information items in a color database, the plurality of the color information items being selected beforehand on the part of the server, causing the plurality of the foregoing color information items selected on the part of the server to be displayed on the foregoing terminal, conducting a questionnaire on the foregoing customer according to the plurality of the foregoing color information items displayed on the foregoing terminal, the plurality of the foregoing color information items being selected on the part of the server, counting popular colors from a result of the foregoing questionnaire so as to store a result of the counting in the foregoing color database and to cause the result of the counting to be displayed on the foregoing terminal, and manufacturing the commodity according to color data that the foregoing customer designates according to the foregoing result of the foregoing counting and inputs from the foregoing terminal.

Additionally, in the above-mentioned invention, the present invention is characterized in that the foregoing commodity is a cosmetic.

Additionally, in order to achieve the above-mentioned object, the present invention, which is a personal color ordering system manufacturing a commodity of a color desired by a customer by a commodity manufacturing apparatus according to information transmitted from a terminal via a communication network to a server, is characterized in that the foregoing terminal comprises displaying means for displaying a plurality of colors used for manufacturing the foregoing commodity, color inputting means for inputting a candidate color desired by the foregoing customer from the plurality of the foregoing colors displayed on the foregoing displaying means, simulating means for performing a simulation display by coloring the foregoing commodity with the foregoing candidate color input by the foregoing color inputting means, and transmitting means for transmitting a designated color designated from the foregoing candidate colors by the foregoing customer to the foregoing commodity manufacturing apparatus.

According to the above-mentioned invention, when a customer inputs a desired candidate color from the color inputting means, this candidate color is displayed (simulation-displayed) by the simulating means in a state where the commodity is colored with this candidate color. That is, it becomes possible to see the commodity imitatively in the state of being colored. Therefore, the customer can surely select a color suitable to the customer's desire.

Additionally, in the above-mentioned invention, the present invention is characterized in that the foregoing terminal further comprises receptacle inputting means for inputting a receptacle desired by the foregoing customer from a plurality of receptacles housing the foregoing commodity displayed on the foregoing displaying means, wherein the foregoing transmitting means transmits the receptacle designated by the foregoing receptacle inputting means to the foregoing commodity manufacturing apparatus, together with the foregoing designated color. Further, in the above-mentioned invention, the present invention is characterized in that the foregoing commodity is a cosmetic.

BRIEF DESCRIPTION OF DRAWINGS

Other objects, features and advantages of the present invention will become more apparent from the following detailed description when read in conjunction with the accompanying drawings.

FIG. 4 is an illustration showing an example of a screen for deciding a color selecting method.

FIG. 6 is an illustration showing an example of an identification data input screen.

FIG. 10 is an illustration showing an example of a questionnaire input screen.

FIG. 12 is an illustration showing an example of an input screen of skin information.

FIG. 18 is an illustration showing an example of a lip-color makeup simulation screen.

FIG. 22 is an illustration showing an example of an order sheet screen.

BEST MODE FOR CARRYING OUT THE INVENTION

Hereinbelow, a description will be given, with reference to the drawings, of embodiments according to the present invention.

Figure 1:
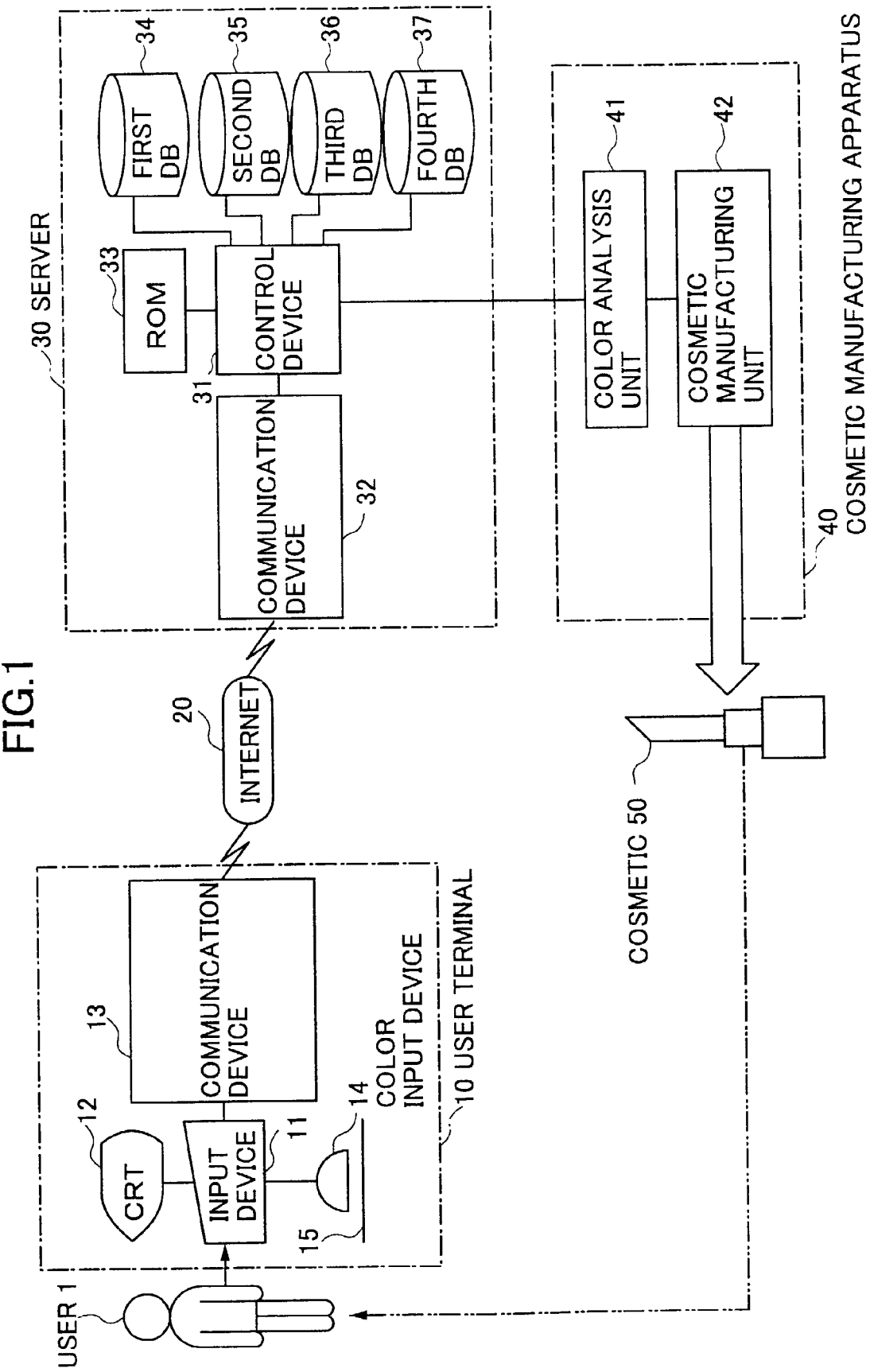
FIG. 1 is an entire configuration diagram of a cosmetic manufacturing system according to a first embodiment of the present invention.

FIG. 1 shows an entire configuration of a personal color ordering system according to a first embodiment of the present invention. The personal color ordering system according to the present embodiment custom-makes a commodity of a color desired by a customer 1, and a cosmetic is taken as an example of the commodity in the present embodiment.

This personal color ordering system mainly comprises a user terminal 10, a server 30, a cosmetic manufacturing apparatus 40, and so forth. Additionally, the user terminal 10 and the server 30 are interconnected by a communication network. It is noted that, in the present embodiment, an example using an Internet 20 as the communication network will be described.

The user terminal 10 comprises an input device 11, a display device (hereinafter, referred to as CRT) 12, a communication device 13, a color input device 14, and so forth. The input device 11 is operated by the customer 1 so as to input hereinafter-described various types of data. The CRT 12 displays information input by the customer 1 and various types of data transmitted from the server 30. The communication device 13 is a device provided for connecting to the Internet 20.

Besides, in each of the following embodiments, descriptions will be given by taking a case using a computer (a PC) owned by the customer 1 (hereinafter referred to as user) as the user terminal 10; however, the user terminal 10 is not limited to a style owned by the user 1, and a computer (a PC) situated at a store or a booth, etc. for selling cosmetics can also be used as the user terminal 10. In this style, the user 1 operates the user terminal 10 either directly or according to a content of a counseling performed by a counselor, etc. of cosmetics for the customer 1.

The color input device 14 is a color-supporting image reader, for example, and is so structured that a color can be input from an input object 15, such as a magazine or a photograph. Accordingly, the user 1 can input a color from any object at hand. A color signal taken in the color input device 14 is transmitted to the input device 11 in which color information is generated.

The user terminal 10 structured as above is connected to the server 30 via the Internet 20. The server 30 comprises a control device 31, a communication device 32, a ROM 33, first to fourth databases 34 to 37, and so forth.

The control device 31 executes hereinafter-described various programs stored in the ROM 33 so as to control overall a cosmetic manufacturing process and a communicating process with the user terminal 10. The communication device 32 is a device provided for connecting the server 30 to the Internet 20.

Various types of data used for retrieving and selecting a color of a cosmetic 50 desired by the user 1 are stored in the first to fourth databases 34 to 37. Among these, color data of the cosmetic 50 is stored in the first to third databases 34 to 36 in a state where the color data of the cosmetic 50 is related to color specifying information based on which to retrieve the color desired by the user 1.

Specifically, the first database 34 is so configured that, assuming identification data of an existing cosmetic (hereinafter referred to as cosmetic identification data) to be the color specifying information, this cosmetic identification data and color data of the existing cosmetic are related to each other and stored therein. At this point, the cosmetic identification data means data for specifying a cosmetic no longer manufactured, and includes various items of data, such as a type number, a manufacturing period and a manufacturer of the cosmetic, and a model hired in a commercial of the cosmetic.

Therefore, when the user 1 wishes to purchase and use again a cosmetic that the user 1 purchased previously which gave the user 1 an excellent usability, color data representing a color of the cosmetic can be specified by inputting the cosmetic identification data and performing a retrieving process of the first database 34 according to this cosmetic identification data. Accordingly, even when the cosmetic is no longer manufactured, a cosmetic of the same color can be manufactured anew according to this specified color data.

Additionally, the second database 35 is so configured that a spectral reflectance and color data of a cosmetic are related to each other and stored therein. As mentioned above, the user terminal 10 comprises the color input device 14, and the color input device 14 is so configured as to output a spectral reflectance of the input object 15 as color information. Accordingly, by assuming the spectral reflectance detected by the color input device 14 to be the color specifying information, and performing a retrieving process of the second database 35 according to this data, color information identical to a color that the user 1 has directly input, or color most similar thereto can be specified.

Additionally, the third database 36 is so configured that skin information data and color data for manufacturing a cosmetic are related to each other and stored therein. At this point, the skin information data is data representing conditions of a skin differing from individual to individual, such as a color of the skin, and a condition (rough, dry) of the skin.

In recent years, research in makeup techniques has been advanced so as to make it possible to specify a color suitable to conditions of a skin. Based thereon, the third database 36 stores the skin information data and the color data being related to each other.

Accordingly, the user 1 inputs conditions of the user's skin from the input device 11, whereby the server 30 performs a retrieving process of the third database 36 according to the skin information data so as to specify a color suitable to the skin conditions of the user 1. Thereby, the user 1 can be informed of a cosmetic of the color suitable to the user's skin.

On the other hand, in the fourth database 37, different from the foregoing first to third databases 34 to 36, is stored color information of a fashion color likely to be in fashion of the current year which is determined beforehand on the part of the server. Normally, a plurality of the fashion colors are determined, and an eventual fashion color is selected according to a questionnaire on consumers.

Subsequently, a description will be given of the cosmetic manufacturing apparatus 40. The cosmetic manufacturing apparatus 40 is an apparatus that manufactures the cosmetic 50 according to instructions of the control device 31 of the server 30. This cosmetic manufacturing apparatus 40 mainly comprises a color analysis unit 41 and a cosmetic manufacturing unit 42.

To the color analysis unit 41, the color data of the cosmetic material 50 to be manufactured is transmitted from the control device 31. In general, a cosmetic material of the cosmetic 50 is manufactured by blending a plurality of monochromatic color materials. Therefor, the color analysis unit 41 analyzes the color data designated from the control device 31 so as to select monochromatic color materials required for generating a cosmetic material of a color corresponding to the color data. Upon deciding these monochromatic color materials, the cosmetic manufacturing unit 42 performs a process of manufacturing a cosmetic according to the monochromatic color materials.

The foregoing cosmetic manufacturing apparatus 40 is not an apparatus mass-producing the cosmetic 50, but is an apparatus of a small-lot production (so to speak, custom-making) type manufacturing the cosmetic 50 one by one. Since this cosmetic manufacturing apparatus 40 custom-makes the cosmetic 50, there is a freedom in color setting upon weighing; therefore, it becomes possible to manufacture a cosmetic of any color.

In addition, the present embodiment employs an apparatus capable of manufacturing fully automatically the cosmetic 50 despite being custom-made. When the cosmetic material 50 is a lipstick, for example, a system of manufacturing a stick-type cosmetic material (Japanese Patent Application No. 2000-78931) proposed previously by the applicant of the present application is applicable as this cosmetic manufacturing apparatus 40. According thereto, it is possible to manufacture the cosmetic 50 in a relatively short time even when being custom-made.

Subsequently, a description will be given of a cosmetic manufacturing process of a cosmetic manufacturing system provided with the above-described hardware configuration.

The server 30 posts a home page on the Internet 20 which home page includes a description to the effect that a cosmetic can be custom-made. The cosmetic manufacturing process according to the present embodiment is started by the user 1 accessing this home page posted on the Internet 20.

Figure 2:
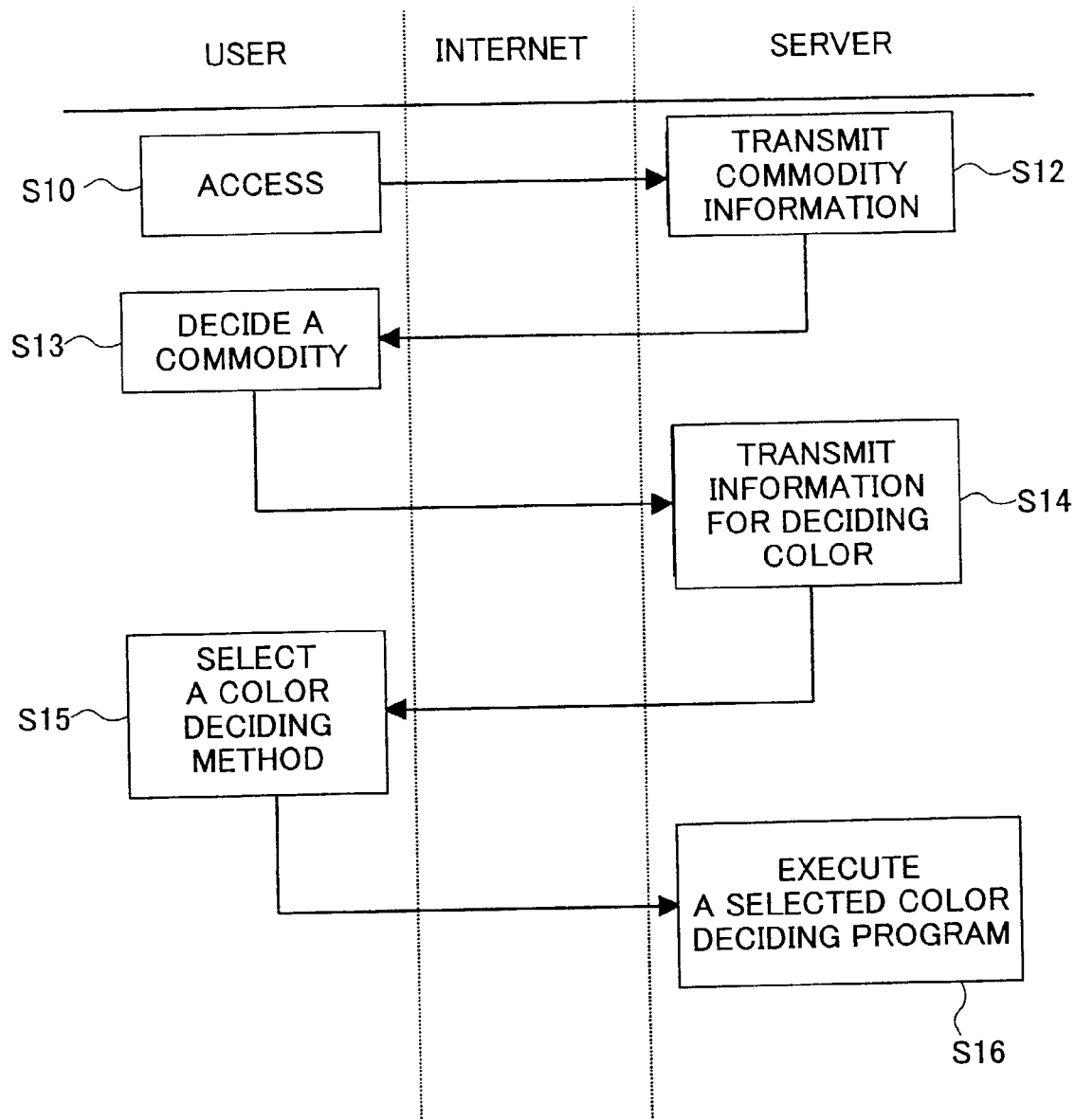
FIG. 2 is a flowchart of a process of selecting a color deciding method which is performed in the cosmetic manufacturing system according to the first embodiment of the present invention.
Figure 3:
FIG. 3 is an illustration showing an example of a commodity selection screen.

FIG. 2 is a flowchart of a process of selecting a color deciding method which is the first process to be performed when the user 1 accesses the server 30. In step 10 (in the figures, step is abbreviated to S), when there is an access from the user 1 to the server 30, the server 30 transmits a drawing with which to select a commodity, to the user terminal 10, in step 12. FIG. 3 illustrates an example of the drawing with which to select a commodity. In the present embodiment, a cosmetic (a commodity) capable of embodying a color desired by the user 1 can be selected from a lipstick, an enamel, an eye shadow, a blusher, and others.

When the drawing illustrated in FIG. 3 is displayed on the CRT 12 of the user terminal 10, the user 1 clicks a display of a desired commodity by using the input device 11. In the present embodiment, the following description continues on the assumption that the user 1 selects the lipstick.

In step 13, when the user 1 inputs the desired commodity into the user terminal 10, this commodity information is transmitted to the server 30 via the Internet 20. Subsequently, the server 30 transmits a screen with which to select a color deciding method, to the user terminal 10. FIG. 4 illustrates an example of the screen causing the user 1 to select a color deciding method. In the present embodiment, for the user 1 to decide a desired color, four types of methods are prepared: ① identification data retrieval; ② direct color input; ③ questionnaire; and ④ counseling.

At this point, the identification data retrieval is a method of assuming identification data of an existing cosmetic (cosmetic identification data) to be the color specifying information, and specifying a color of a cosmetic desired by the user 1 according to this cosmetic identification data. As mentioned above, the cosmetic identification data means data for specifying a cosmetic no longer manufactured, and is data of various sorts, such as a type number, a manufacturing period and a manufacturer of the cosmetic, and a model hired in a commercial of the cosmetic. This cosmetic identification data is primarily data of a cosmetic of a company's own; however, storing data of other companies enables a wide-range retrieval of cosmetics.

Additionally, the direct color input is a method of assuming color information data that the user 1 inputs by using the color input device 14 provided in the user terminal 10 to be the color specifying information, and specifying a color of a cosmetic desired by the user 1 according to this color information data. Accordingly, when selecting this method, the user 1 can directly designate a desired color.

Additionally, in the questionnaire, the user 1 is provided with a plurality of fashion colors likely to be in fashion of the current year which are determined beforehand on the part of the server, and the user 1 is requested to answer which of the colors is the user's favorite in the form of a questionnaire. This questionnaire result is provided to the user 1 so that the user 1 can decide a desired color according to the result. According to this method, there are advantages that the server 30 can grasp consumers' needs toward fashion colors, and that the user 1 can be informed of fashion colors of the current year quickly.

Additionally, the counseling is a method of assuming skin information data that the user 1 inputs by using the input device 11 provided in the user terminal 10 to be the color specifying information, and specifying a color of a cosmetic suitable to the skin of the user 1 according to this skin information data. As mentioned above, the skin information data is data representing conditions of a skin differing from individual to individual, such as a color of the skin, and a condition (rough, dry, etc.) of the skin. According to this method, the user 1 can specify a color suitable to the skin conditions of the user 1.

The description will continue, returning to FIG. 2. When the screen illustrated in FIG. 4 is displayed on the CRT 12 of the user terminal 10 by a process of step 14, the user 1 clicks a display of a desired color selecting method by using the input device 11. This color selecting method designated by the user 1 is transmitted to the server 30, whereby the server 30 executes a program of the selected color setting (step 16).

First, a description will be given of a specific process of the identification data retrieval.

Figure 5:
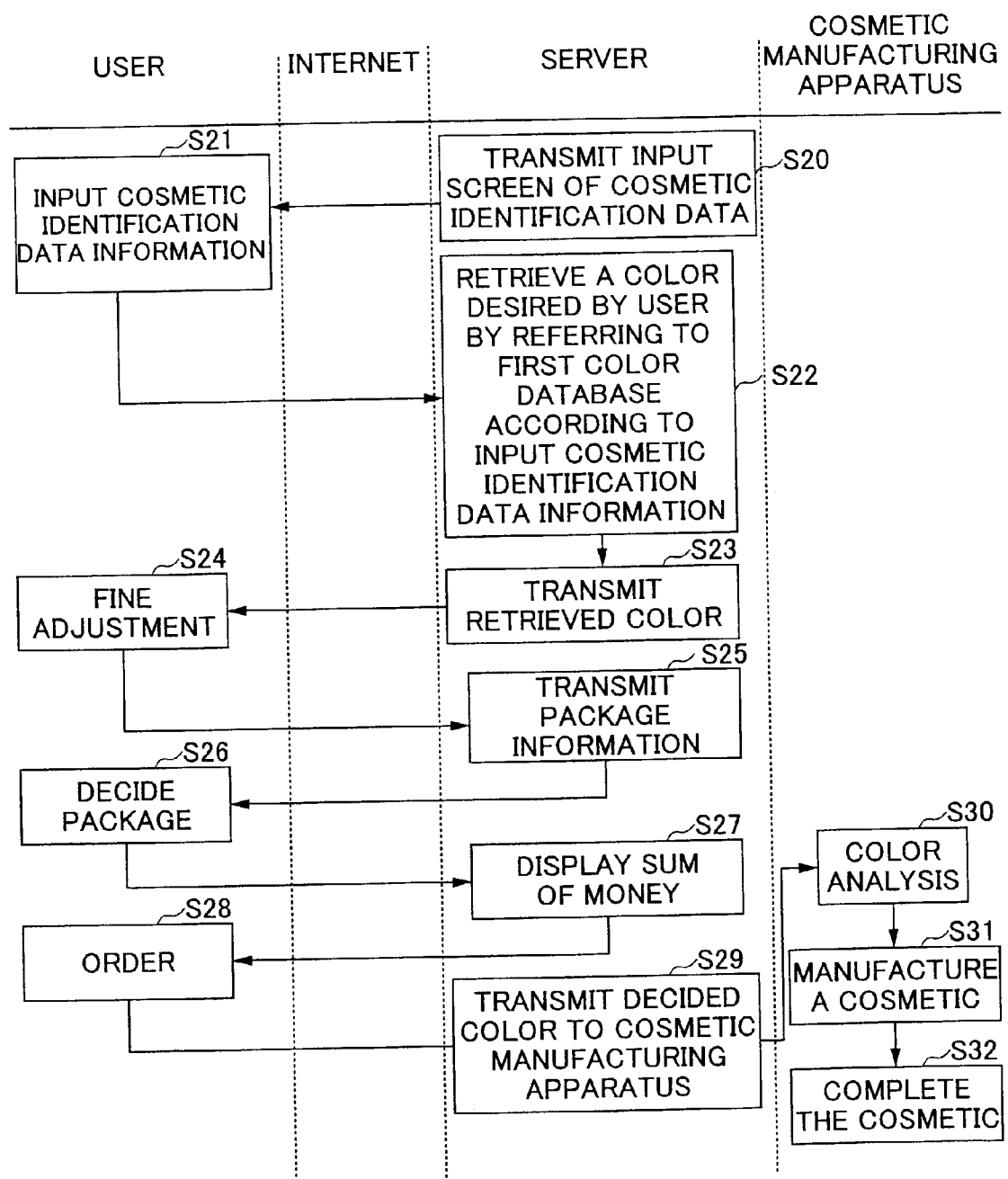
FIG. 5 is a flowchart of a cosmetic material manufacturing process based on identification data which is performed in the cosmetic manufacturing system according to the first embodiment of the present invention.

FIG. 5 shows a process performed when the user 1 selects a color deciding method by the identification data retrieval. When the process shown in the figure commences, the server 30 transmits an input screen of cosmetic identification data to the user terminal 10 in step 20.

FIG. 6 illustrates an example of the input screen of cosmetic identification data. In the present embodiment, a manufacture type number, a product manufacturing period, a manufacturer, and a model who appeared in a commercial, are assumed to be the cosmetic identification data. Besides, the cosmetic identification data is not limited to each of the items of the present embodiment, and other data may be used so long as the data can specify an existing cosmetic of a color desired by the user 1.

When the screen for inputting cosmetic identification data illustrated in FIG. 6 is transmitted from the server 30, the user 1 performs an input process with respect to each of the items of the cosmetic identification data by using the user terminal 10 in step 21 (unnecessary to respond to all of the items). In subsequent step 22, the control device 31 retrieves color data of a color desired by the user 1 by referring to the first database 34 according to the cosmetic identification data transmitted from the user terminal 10 to the server 30.

Figure 7:
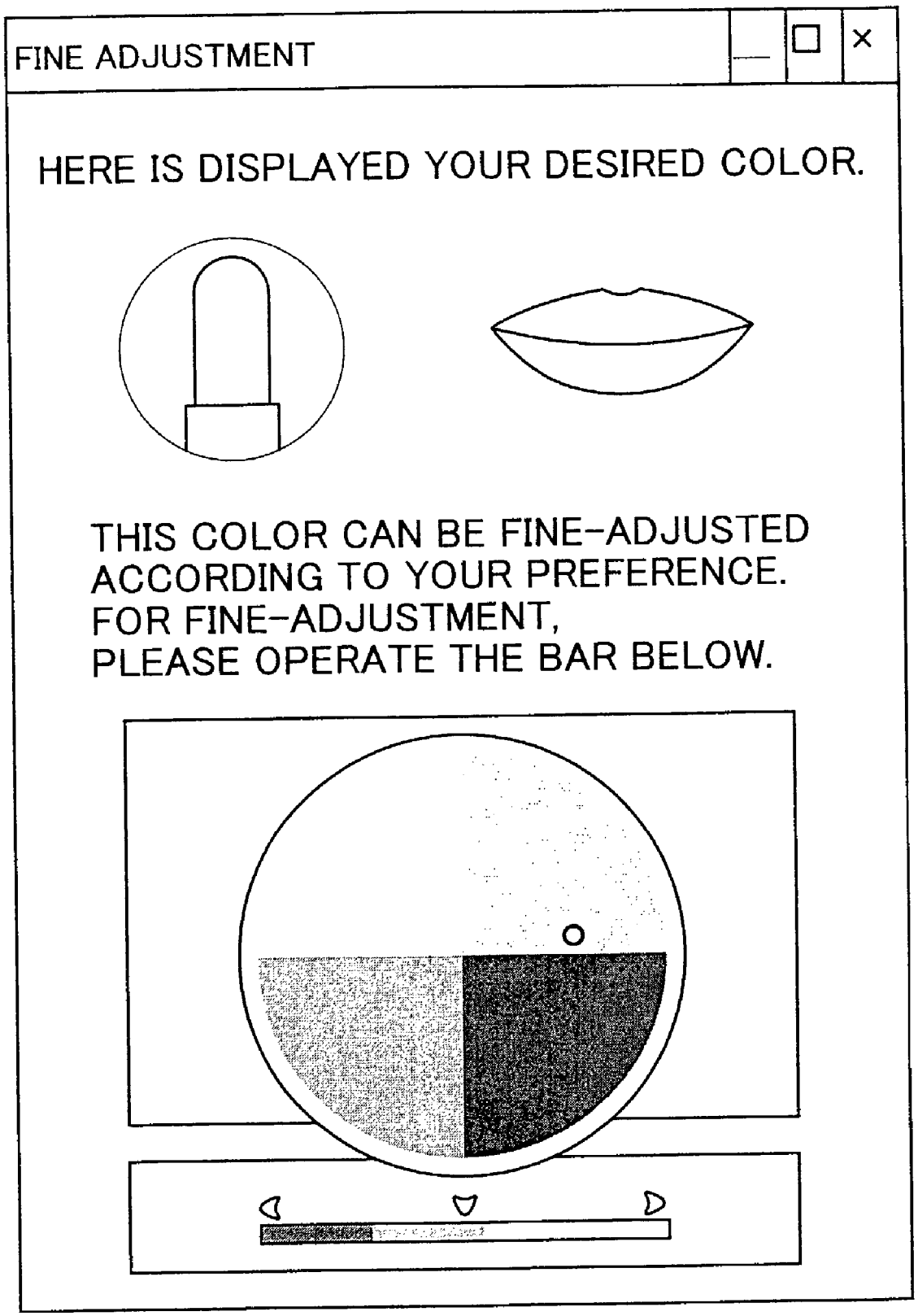
FIG. 7 is an illustration showing an example of a fine adjustment screen.

When the color data of the color desired by the user 1 is retrieved in step 22, this retrieved color data is transmitted to the user terminal 10 in subsequent step 23. FIG. 7 illustrates an example of a screen transmitted upon this occasion. As shown in the figure, in the present embodiment, not only the retrieved color data is simply displayed, but also a fine adjustment of the color data can be performed by the user 1.

Accordingly, when the user 1 intends to perform the fine adjustment of the color data, the user 1 performs a fine adjustment process in step 24. A result of performing this fine adjustment is transmitted to the server 30, whereby the color data of the color desired by the user 1 is specified. Subsequently, in step 25, the server 30 transmits information of a package to the user terminal 10 in which package a cosmetic material of the specified color data is caused to be stored.

The user 1 decides a package according to the information of a package (though not shown in the figures, a design, a color and so forth of the package are displayed on the CRT 12) transmitted from the server 30 (step 26). A type of this package decided by the user 1 is transmitted to the server 30. Subsequently, in step 27, the server 30 calculates a sum of money of a cosmetic of the color designated by the user 1, and causes the user terminal 10 to display this.

The user 1 sees this sum of money displayed on the user terminal 10, and when purchasing, performs an ordering process to the server 30. Thereby, the control device 31 transmits the color data of the desired color designated by the user 1 to the cosmetic manufacturing apparatus 40.

When the color data is transmitted from the server 30, the cosmetic manufacturing apparatus 40 performs a color analysis as mentioned above, in step 30, so as to select monochromatic materials for generating the color corresponding to the color data. In subsequent step 31, the cosmetic material of the color desired by the user 1 is manufactured by performing processes, such as blending the monochromatic materials selected in step 30.

This manufactured cosmetic material is loaded into the package designated by the user 1, whereby the cosmetic 50 is completed (step 32). The cosmetic 50 thus manufactured is sent to the user 1 by using means for distribution.

Thus, when the user 1 selects the color deciding method by the identification data retrieval, the user 1 can designate a desired color by inputting cosmetic identification data at the user terminal 10 without directly inputting the desired color. Additionally, it becomes possible to manufacture the cosmetic 50 desired by the user 1 on a customer-by-customer basis so as to cope with diversification of customers' purchasing preferences.

Subsequently, a description will be given of a specific process of the direct color input.

Figure 8:
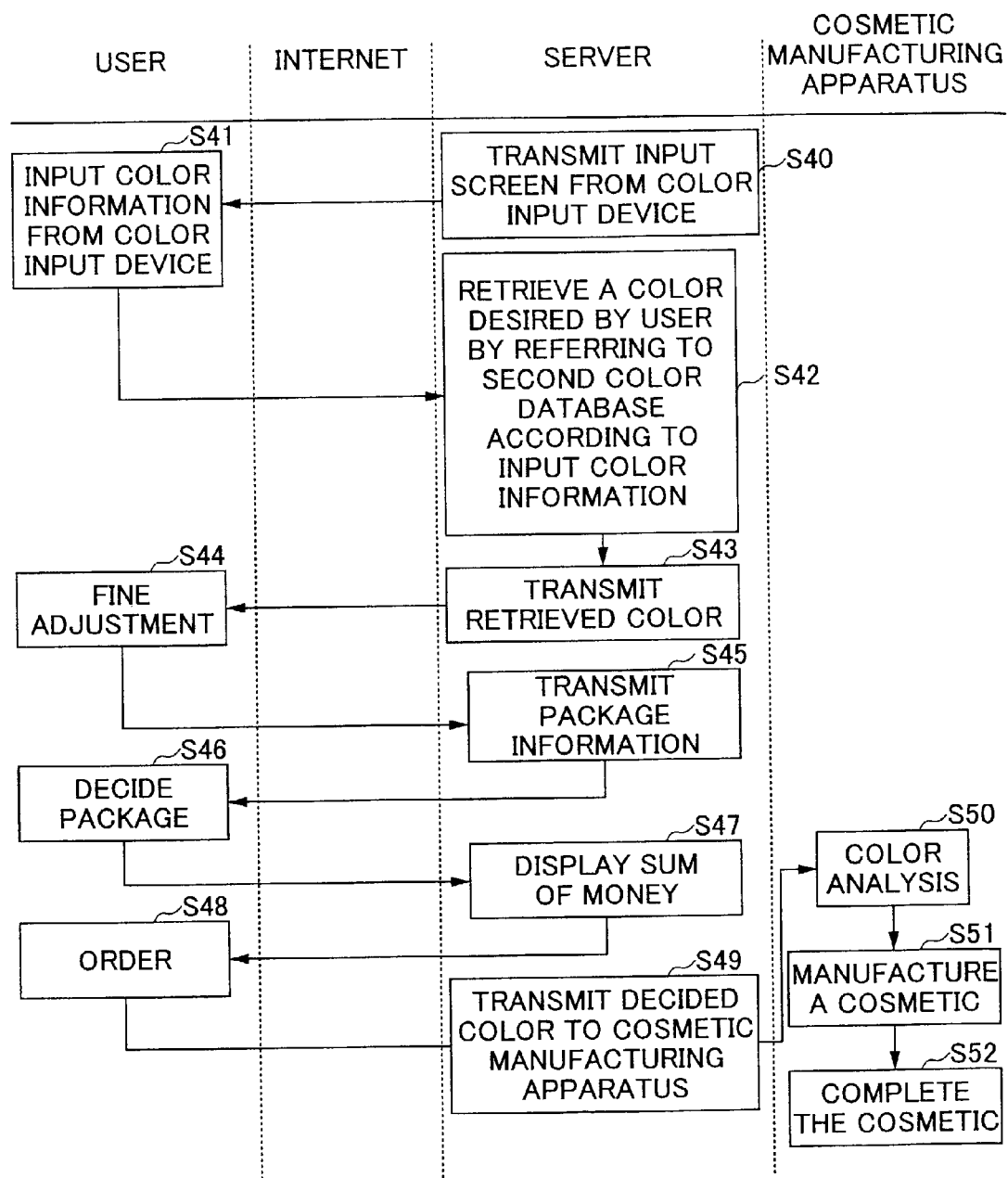
FIG. 8 is a flowchart of a cosmetic material manufacturing process based on color information from a color input device which is performed in the cosmetic manufacturing system according to the first embodiment of the present invention.

FIG. 8 shows a process performed when the user 1 selects a color deciding method by the direct color input. When the process shown in the figure commences, the server 30 transmits an input screen for performing the direct color input (hereinafter referred to as direct input screen) to the user terminal 10 in step 40.

When the direct input screen is transmitted from the server 30, the user 1 inputs a desired color on the input object 15 by using the color input device 14 in step 41. Since this color input device 14 can perform an input process only by scanning on the input object 15, it is possible to input from a plane object, such as a magazine or a photograph, or also from a solid object. This color information (hereinafter referred to as direct input color information) directly input by the user 1 from the color input device 14 is transmitted to the server 30.

In subsequent step 42, the control device 31 retrieves color data of the color desired by the user 1 by referring to the second database 35 according to the direct input color information transmitted from the user terminal 10 to the server 30.

When the color data of the color desired by the user 1 is retrieved in step 42, similar processes as in steps 23 to 32 of the above-described identification data retrieving process are performed in steps 43 to 52.

That is, in step 43, the color data retrieved in step 42 is transmitted to the user terminal 10, and when the user 1 intends to perform a fine adjustment of the color data, the user 1 performs a fine adjustment process in step 44. A result of performing this fine adjustment is transmitted to the server 30, whereby the color data of the color desired by the user 1 is specified.

Subsequently, in step 45, the server 30 transmits information of a package to the user terminal 10 in which package a cosmetic material of the specified color data is caused to be stored. The user 1 decides a package according to this transmitted content, and performs a setting of the package to the server 30 (step 46).

Subsequently, in step 47, the server 30 causes the user terminal 10 to display a sum of money of a cosmetic of the color designated by the user 1, and when purchasing, the user 1 performs an ordering process to the server 30 (step 48). Thereby, the control device 31 transmits the color data of the desired color designated by the user 1 to the cosmetic manufacturing apparatus 40, and the cosmetic manufacturing apparatus 40 performs processes of steps 50 to 52 so as to manufacture the cosmetic 50 of the color desired by the user 1.

When the user 1 selects the color deciding method by the direct color input as above, the user 1 can input desired color information from any of the input object 15 (including plane and solid objects) which can be input by the color input device 14. Therefore, according to the present method, it becomes possible to manufacture a cosmetic that suits diversified needs of the user 1 for colors.

Subsequently, a description will be given of a specific process of the questionnaire.

Figure 9:
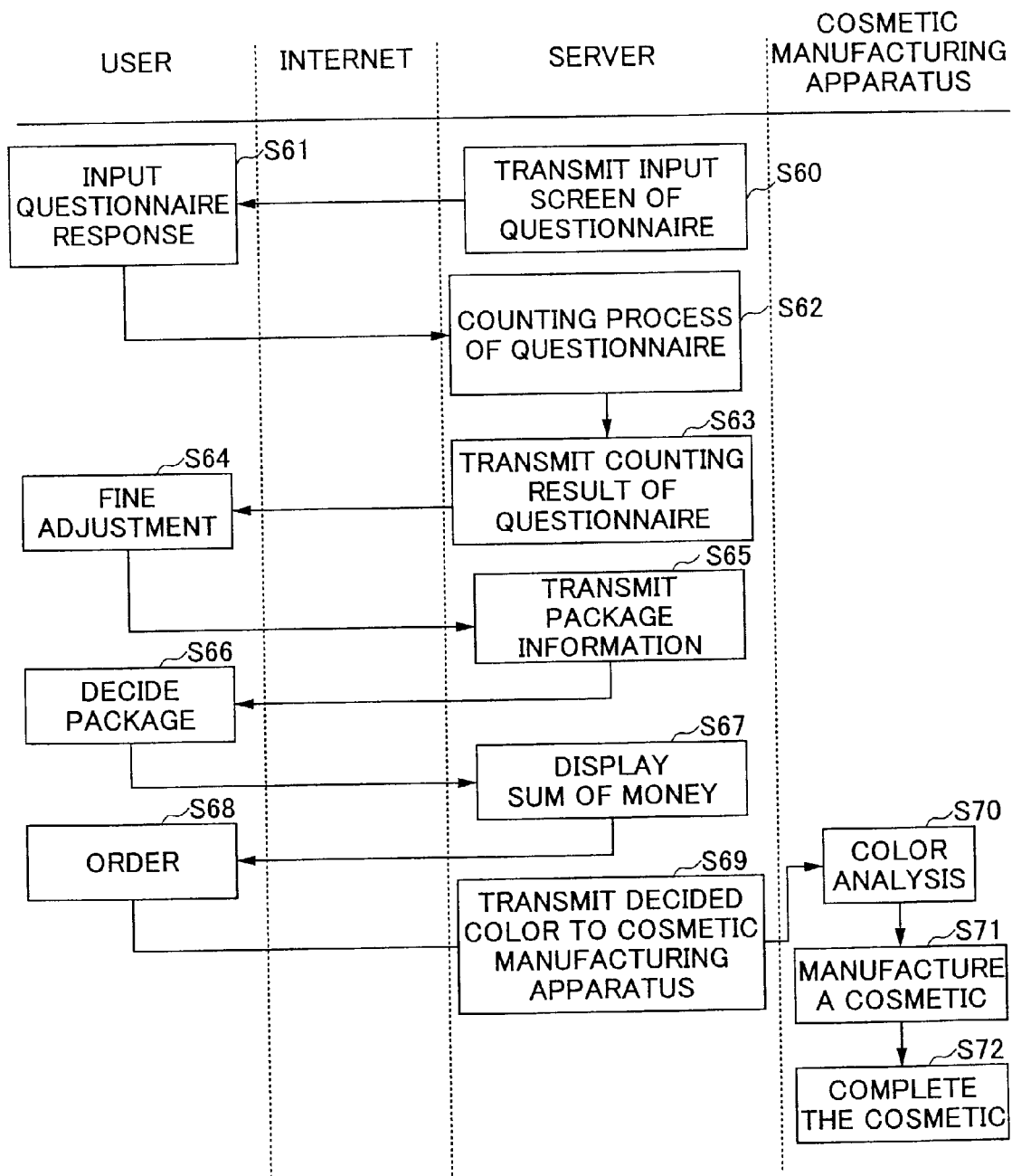
FIG. 9 is a flowchart of a cosmetic material manufacturing process based on a questionnaire from a customer which is performed in the cosmetic manufacturing system according to the first embodiment of the present invention.

FIG. 9 shows a process performed when the user 1 selects a color deciding method by the questionnaire. When the process shown in the figure commences, the server 30 transmits an input screen of a questionnaire to the user terminal 10 in step 60.

FIG. 10 illustrates an example of the input screen of a questionnaire. In the questionnaire in the present deciding method, the server presents the user 1 beforehand with a plurality of color information (six color information in the present embodiment) likely to be in fashion of the current year, and the user 1 is requested to vote for a color that the user 1 favors among the colors. The user 1, looking at the screen illustrated in FIG. 10, inputs a number attached to a color that the user 1 favors most in a vote entry box.

When the questionnaire response is input in step 61, the process proceeds to step 62, in which the control device 31 of the server 30 performs a counting process of the questionnaire according to the questionnaire response transmitted from the user terminal 10. The counting process of the questionnaire performed here is a process of calculating how many votes are cast for the above-mentioned plurality of colors likely to be in fashion of the current year. That is, the process performed here is a counting process of a so-called popularity vote for deciding which is the most popular among the plurality of colors expected to be in fashion stored in the fourth database 37.

When this counting process of the questionnaire is finished, the server 30 transmits a result of this counting to the user 1 (step 63). Accordingly, the user 1 can select a color of a cosmetic by referring to the result of the counting transmitted from the server 30.

Additionally, in the present deciding method, not only this result of the counting is simply displayed, but also a fine adjustment of the color can be performed by the user 1. Thus, when the user 1 selects one color from among the above-mentioned six colors according to the result of the counting, the user 1 can perform a fine adjustment with respect to this color.

Color information of the color that the user 1 selects according to the result of the counting, and a result of the fine adjustment are transmitted to the server 30, whereby color data of the color desired by the user 1 is specified.

When the color data of the color desired by the user 1 is specified in step 64, processes of steps 65 to 72 are subsequently performed. It is noted that, since the processes of steps 65 to 72 are similar processes as step 25 to step 32 of the above-described identification data retrieving process, descriptions thereof are omitted.

When selecting the above-described color deciding method by the questionnaire, the user 1 can be quickly informed of a color expected to be in fashion of the current year, and can quickly purchase the cosmetic 50 of the color expected to be in fashion of the current year. On the other hand, the server 30 can be informed of a trend on which color suites consumers' needs among the plurality of the colors expected to be in fashion.

Subsequently, a description will be given of a specific process of the counseling.

Figure 11:
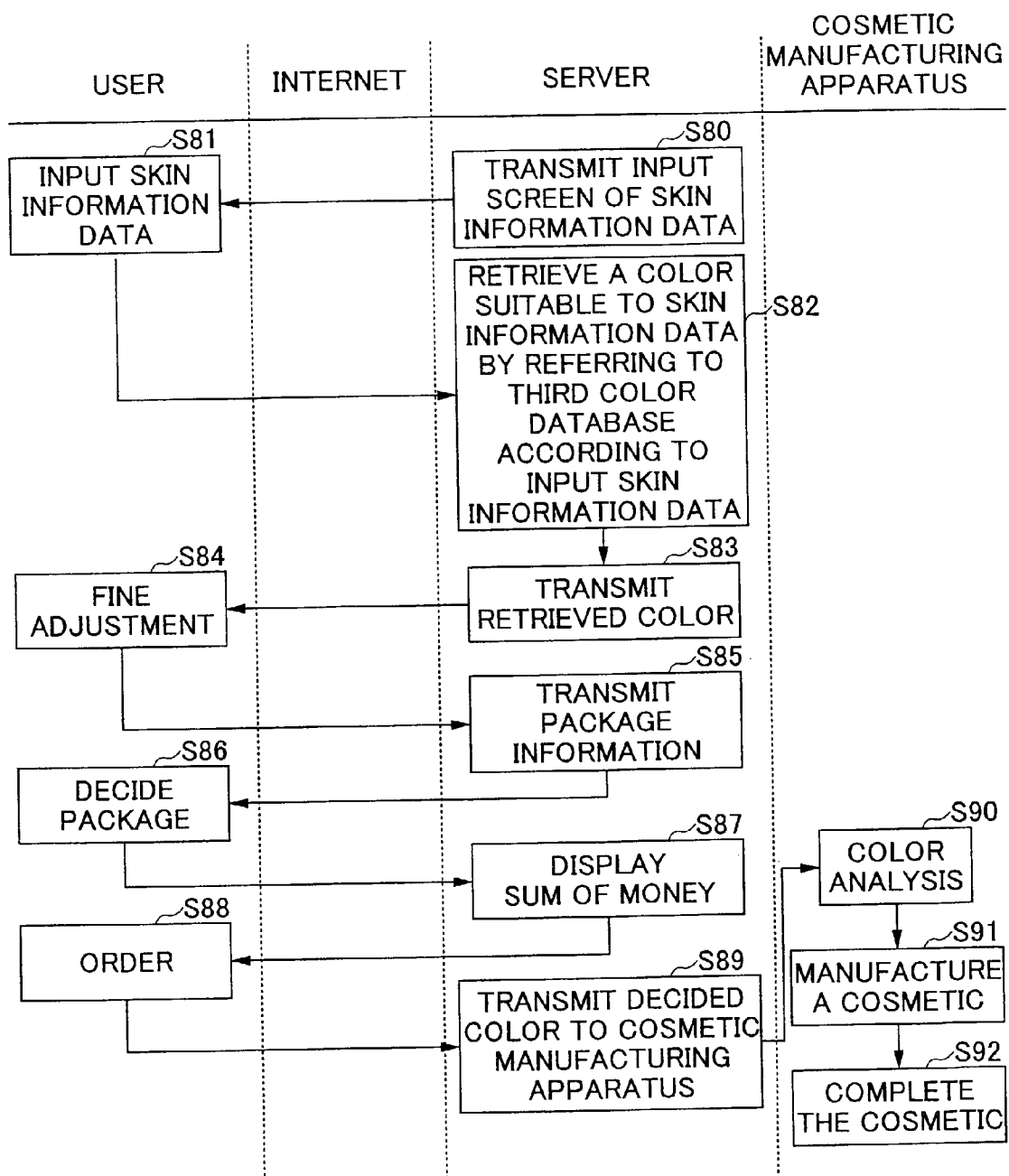
FIG. 11 is a flowchart of a cosmetic material manufacturing process based on information of a skin from a customer which is performed in the cosmetic manufacturing system according to the first embodiment of the present invention.

FIG. 11 shows a process performed when the user 1 selects a color deciding method by the counseling. In the present embodiment, a counseling is performed with respect to conditions of the skin of the user 1, and skin information data of the user 1 obtained by this counseling is used as the color specifying information.

When the process shown in the figure commences, the server 30 transmits an input screen of skin information data to the user terminal 10 in step 80. FIG. 12 illustrates an example of the input screen of skin information data. In the present embodiment, a color of the skin, a condition of the skin, and so forth are assumed to be the skin information data. Besides, the skin information data is not limited to each of the items of the present embodiment, and other data may be used so long as the data can specify the conditions of the skin of the user 1.

When the screen for inputting skin information data illustrated in FIG. 12 is transmitted from the server 30, the user 1 performs an input process with respect to each of the items of the skin information data by using the user terminal 10 in step 81. In subsequent step 82, the control device 31 retrieves color data of a color most suitable to the conditions of the skin of the user 1 by referring to the third database 36 according to the skin information data transmitted from the user terminal 10 to the server 30.

As mentioned above, in recent years, research in makeup techniques has been advanced so as to make it possible to specify a color suitable to conditions of a skin, and based thereon, the third database 36 stores the skin information data and the color data being related to each other. Accordingly, the user 1 inputs the conditions of the skin of the user 1 in step 81, whereby the server 30 can specify the color suitable to the skin conditions of the user 1.

When the color data of the color suitable to the conditions of the skin of the user 1 is retrieved in step 82, this retrieved color data is transmitted to the user terminal 10 in subsequent step 83. Then, when the user 1 intends to perform a fine adjustment of the color data, the user 1 performs a fine adjustment process in step 84. A result of performing this fine adjustment is transmitted to the server 30, whereby the color data of the color desired by the user 1 is specified.

When the color data of the color desired by the user 1 is specified in step 84, processes of steps 85 to 92 are subsequently performed. It is noted that, since the processes of steps 85 to 92 are similar processes as step 25 to step 32 of the above-described identification data retrieving process, descriptions thereof are omitted.

When selecting the color deciding method by the counseling as above, it becomes possible to select a cosmetic of the color most suitable to the skin information data input from the user 1 and present this to the user 1. Accordingly, the user 1 can purchase the cosmetic of the user's own most suitable to the face or the skin of the user 1.

Besides, although, in the above-described embodiment, the color deciding methods are of four types which are the identification data retrieval, the direct color input, the questionnaire and the counseling, other color deciding methods than these may be adopted.

Subsequently, a description will be given of a second embodiment according to the present invention.

Figure 13:
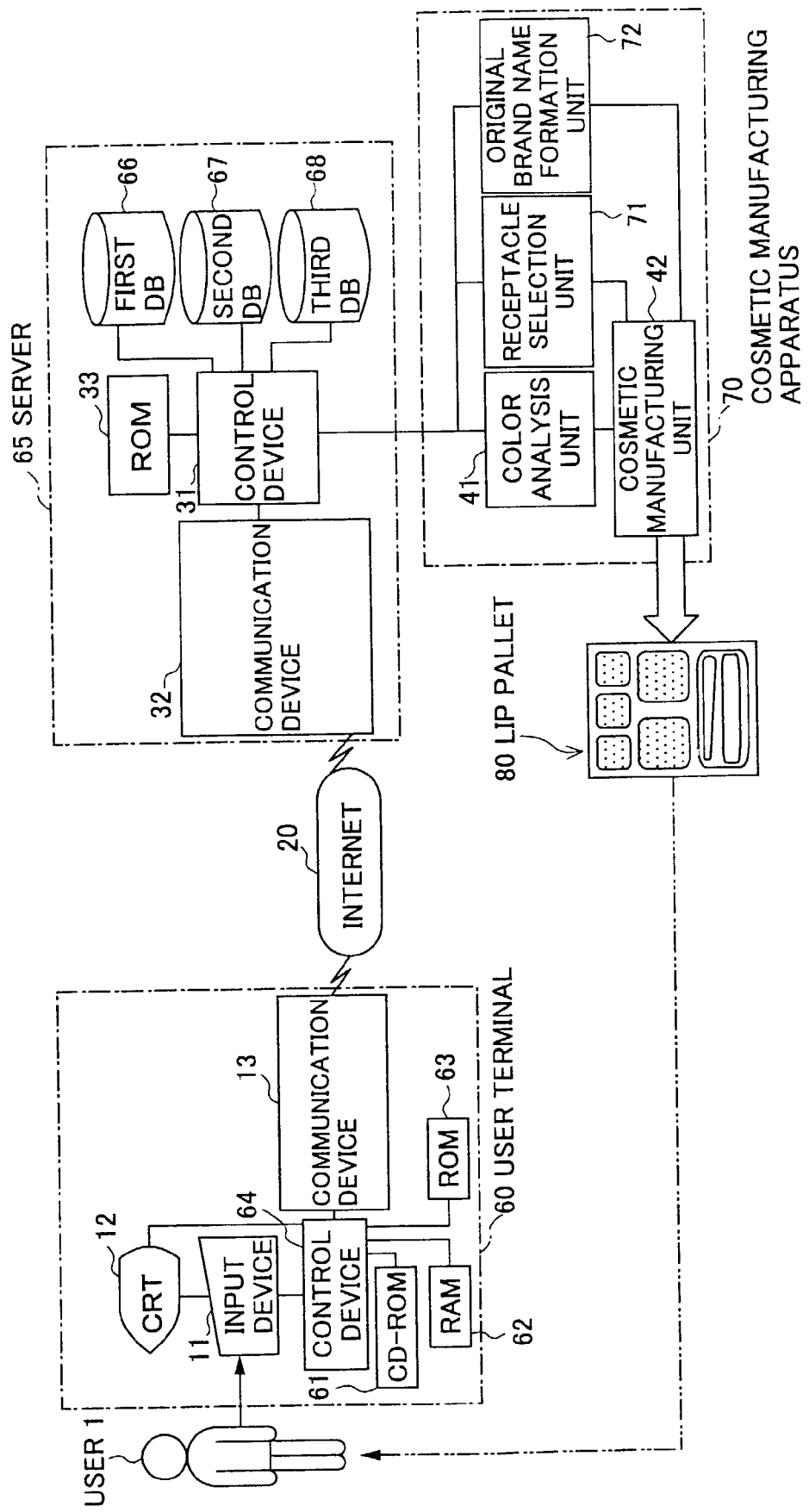
FIG. 13 is an entire configuration diagram of a cosmetic manufacturing system according to a second embodiment of the present invention.

FIG. 13 shows an entire configuration of a personal color ordering system according to a second embodiment of the present invention. Besides, in FIG. 13, components that are identical to the components of the system according to the first embodiment shown in FIG. 1 are referenced by the same reference marks, and descriptions thereof will be omitted.

The personal color ordering system according to the present embodiment loads a lip-color of a color desired by the customer in a lip pallet 80, and sells this to the user 1. Here, in the lip pallet 80, a pallet as a receptacle is filled with a lip-color and a lip-gloss, and an applicator for applying these is housed therein.

The personal color ordering system according to the present embodiment mainly comprises a user terminal 60, a server 65, a cosmetic manufacturing apparatus 70, and so forth. Additionally, the user terminal 60 and the server 65 are interconnected by the Internet 20.

A recording medium (CD) in which a color ordering program performing a hereinafter-described color ordering process is stored is mounted on a CD-ROM 61. The color ordering program read in the CD-ROM 61 is stored in a RAM 62.

Various programs and data required for control operations of a hereinafter-described control device 64 are stored in a ROM 63. The control device 64 controls overall the foregoing devices and units 11 to 13 and 61 to 63, and executes the color ordering program so as to perform the color ordering process.

The user terminal 60 structured as above is connected to the server 65 via the Internet 20. The server 65 comprises the control device 31, the communication device 32, the ROM 33, first to third databases 66 to 68, and so forth.

Personal information of the user 1 is stored in the first database 66 according to the present embodiment. Here, the personal information means a name, an address, an e-mail address, attribute data (preference, date of birth, etc.), and so forth of the user 1.

In the present system, the user 1 registers so that a hereinafter-described color order becomes possible. Upon this registration, the above-mentioned personal information is presented from the user 1, and this is stored in the first database 66.

Various types of data related to a questionnaire are stored in the second database 67. As described hereinbelow, after selling the lip pallet 80 to the user 1, the server 65 conducts a questionnaire on the user 1. Contents of this questionnaire, questionnaire count data obtained by counting responses to the questionnaire responded from the user 1, and so forth are stored in the second database 67.

Various types of data regarding a wannabe image are stored in the third database 68. As described hereinbelow, four images of "elegant", "fresh", "cute" and "cool" are set as the wannabe image in the present embodiment, and reference colors corresponding to the respective images are selected beforehand. These wannabe images and data of the reference colors corresponding to the respective images (hereinafter, this data is referred to as image correspondent color data) are stored in the third database 68.

The cosmetic manufacturing apparatus 70 is an apparatus that manufactures the lip pallet 80 according to instructions of the control device 31 of the server 65. This cosmetic manufacturing apparatus 70 mainly comprises the color analysis unit 41, the cosmetic manufacturing unit 42, a receptacle selection unit 71, an original brand name formation unit 72, and so forth.

To the color analysis unit 41, information of a color ordered by the user 1 is transmitted via the server 65. As described above, a lip-color in general is generated by blending a plurality of monochromatic color materials. Therefor, the color analysis unit 41 analyzes the ordered color so as to select monochromatic color materials required for generating a lip-color of a color corresponding to the ordered color. Upon deciding these monochromatic color materials, the cosmetic manufacturing unit 42 performs a process of manufacturing the lip-color according to the monochromatic color materials.

To the receptacle selection unit 71, information of a pallet selected by the user 1 is transmitted via the server 65. The receptacle selection unit 71 selects the pallet selected by the user 1 from a receptacle storage rack in which various pallets are stored, and conveys the pallet to the cosmetic manufacturing unit 42. The cosmetic manufacturing unit 42 fills this selected pallet with the lip-color manufactured as above.

The original brand name formation unit 72 performs a process of forming an original brand name of the user 1 on the pallet. In the present embodiment, at the user-1's desire, the user 1 can give an original brand name of the user-1's own on the pallet to be purchased. Thereby, the user 1 can have the one and only lip pallet 80 in the world which lip pallet is given the original brand name of the user-1's own.

Like the cosmetic manufacturing apparatus 40 according to the first embodiment, the above-mentioned cosmetic manufacturing apparatus 70 is not an apparatus mass-producing the lip pallet 80, but is an apparatus of a small-lot production (so to speak, custom-making) type manufacturing the lip pallet 80 one by one. In addition, the present embodiment also employs an apparatus capable of manufacturing fully automatically the lip pallet 80 despite being custom-made.

Subsequently, a description will be given of a cosmetic manufacturing process of a cosmetic manufacturing system configured as above.

Figure 14:
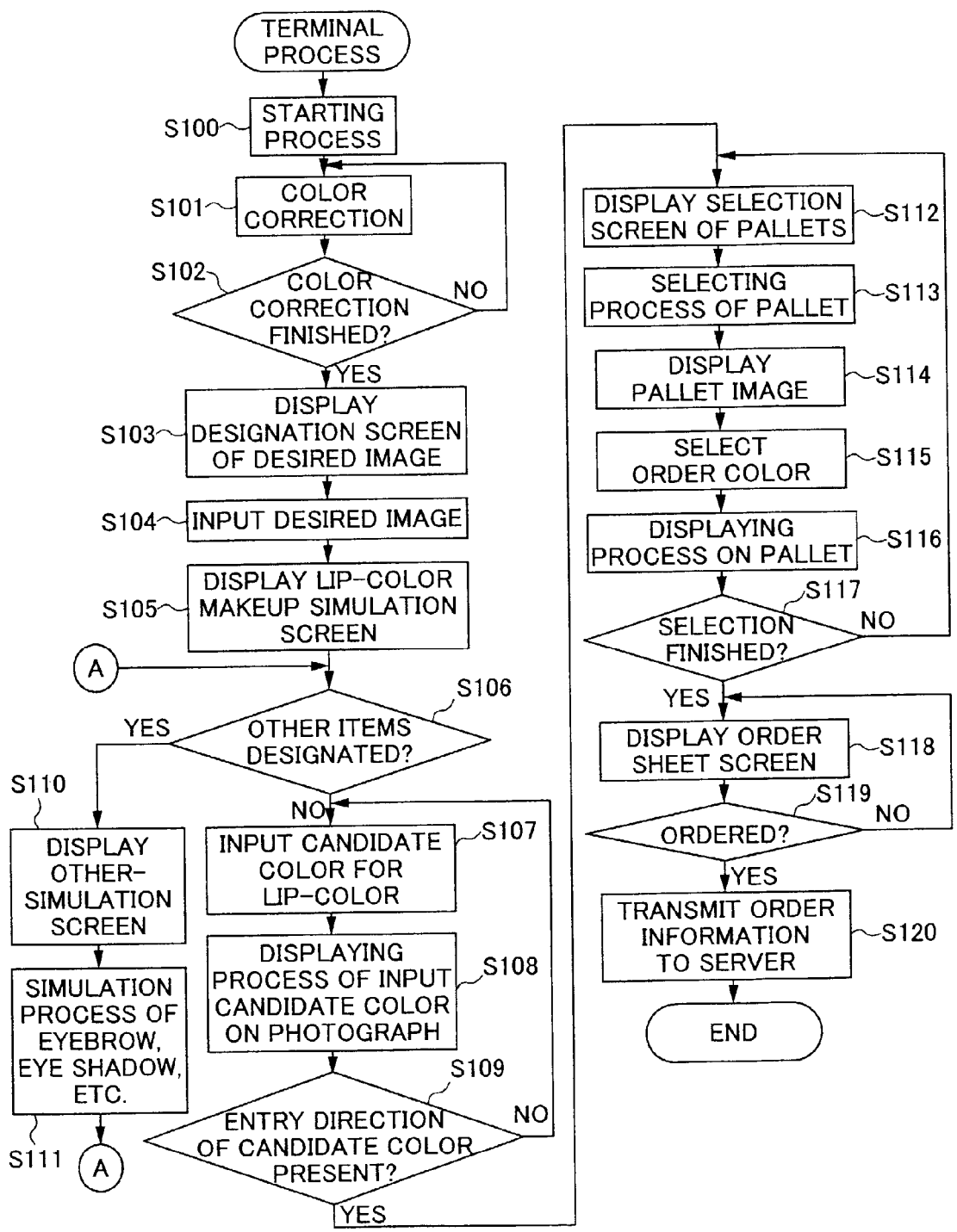
FIG. 14 is a flowchart of a process of a terminal in the cosmetic manufacturing system according to the second embodiment of the present invention.

FIG. 14 is a flowchart of the color ordering process performed in the user terminal 60. The color ordering process shown in the figure commences by the recording medium (CD) in which the color ordering program is stored being mounted on the CD-ROM 61.

The present system employs a membership system, which grants a CD (a CD card) to the user 1 having performed a membership registration. Upon performing this membership registration, the user 1 is requested to present the predetermined personal information (a name, an address, an e-mail address, attribute data, etc.), and this personal information is stored in the first database 66 of the server 65. Additionally, a facial photograph of the user 1 is taken upon the membership registration, and this facial photograph is stored in the CD (the CD card) as data.

When the process shown in the figure commences, the control device 64 first performs a starting process in step 100. In this starting process, a process of reading the color ordering program and various types of data recorded on the CD-ROM 61 is performed.

When the starting process is finished, a color correction is subsequently performed in step 101. As described hereinafter, in the present embodiment, the user 1 selects a desired color while looking at colors displayed on the CRT 12. Therefore, it is necessary to make appropriate the colors displayed on the CRT 12, and therefor, a color correction process is performed. When it is judged in step 102 that the color correction process is finished, the process proceeds to step 103.

Figure 17:
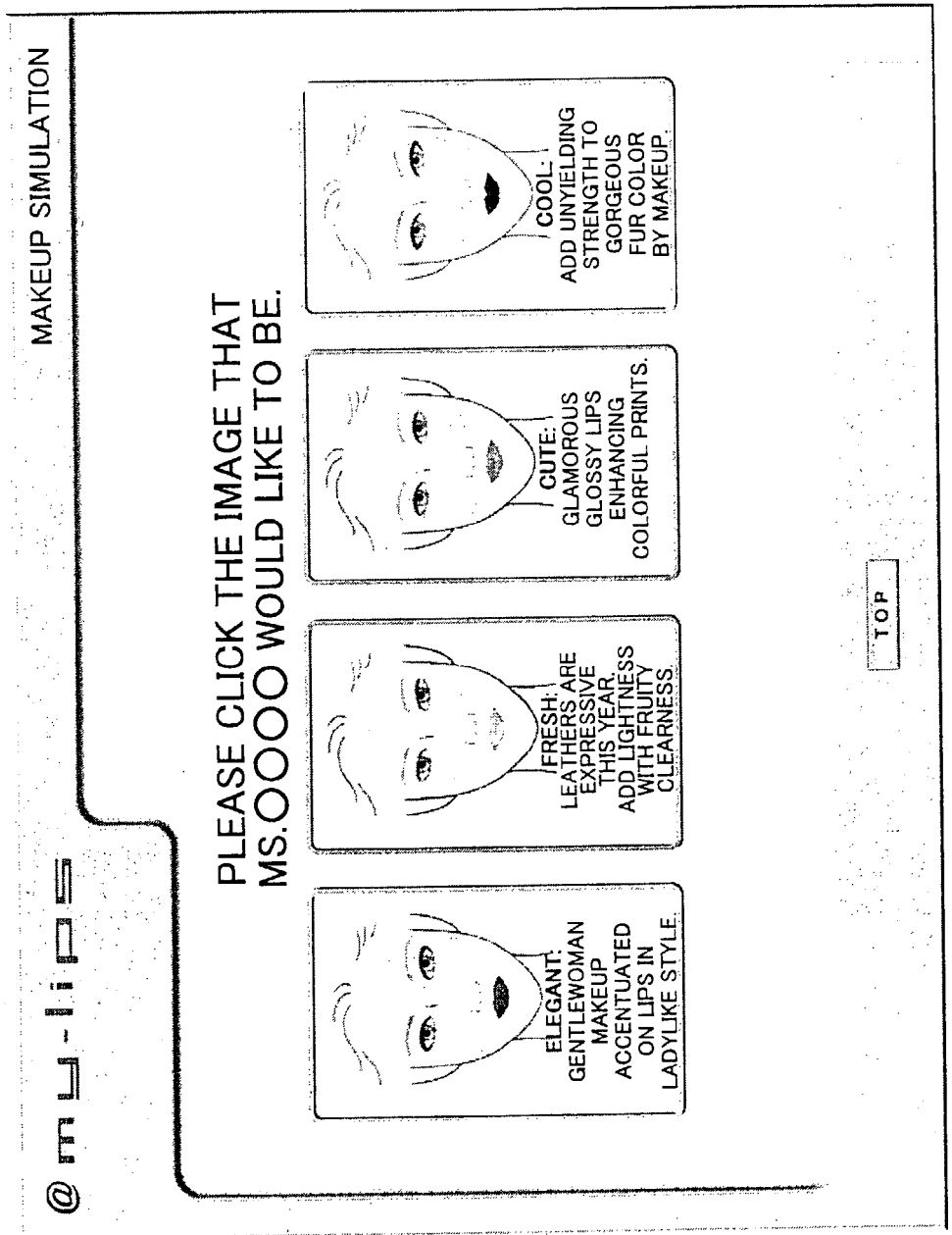
FIG. 17 is an illustration showing an example of a designation screen of a desired image.

In step 103, a designation screen of a desired image is displayed on the CRT 12. FIG. 17 illustrates an example of the designation screen of a desired image. As mentioned above, the four images of "elegant", "fresh", "cute" and "cool" are set in the present embodiment. The user 1 inputs a desired image from this designation screen of a desired image by the input device 11 (step 104).

When the desired image is input from the user 1 in step 104, the control device 64 causes the process to proceed to step 105, and displays a lip-color makeup simulation screen on the CRT 12. FIG. 18 illustrates an example of the lip-color makeup simulation screen. The figure shows the screen when "elegant" is designated in step 104.

In subsequent step 106, it is judged whether or not other items are designated. When a negative judgment is made in step 106, the process proceeds to step 107, in which an input process of a candidate color for a lip-color is performed.

This input process of a candidate color for a lip-color is performed by the user 1 while looking at the lip-color makeup simulation screen illustrated in FIG. 18. As shown in the figure, the lip-color makeup simulation screen comprises a color display pallet part 81, a facial photograph display part 82, a candidate color pallet part 83, a candidate color entry button 84, and so forth.

A hundred different types of colors are displayed on the color display pallet part 81, and the user 1 selects from this color display pallet part 81 a color that the user wants to put in the lip pallet 80. Additionally, the color display pallet part 81 is so structured that colors corresponding to the desired image input in step 104 are displayed as "recommendations".

Besides, the "recommendations" of colors corresponding to the desired image vary according to vogues and seasons. Therefore, the image correspondent color data stored in the foregoing third database 68 provided in the server 65 is transmitted to the user terminal 60 via the Internet, and is automatically updated.

The face of the user 1 stored in the CD card upon the registration is displayed on the facial photograph display part 82. When the user 1 designates the desired color in the color display pallet part 81 (step 107), the designated color is displayed at a lip part of the face of the user 1 displayed on the facial photograph display part 82 (step 108). Thus, the user 1 can imitatively see a state where a lip-color of the designated color is applied.

As described above, in the present system, since the customer can see the simulation screen where the lip-color of the designated color is applied on the customers own lips, the user 1 can surely select a color suitable to the desire of the user 1. Besides, Japanese Laid-Open Patent Application No. 2000-11145 "Lipstick Color Converting System", for example, is applicable as a specific means for the above-described simulation process.

By performing the above-described simulation while looking at this simulation screen, the user 1 selects the desired color (the candidate color). This candidate color is displayed on the candidate color pallet part 83. This process of selecting a candidate color may be performed by double-clicking a display position of the desired color on the color display pallet part 81, or by dragging-and-dropping from the color display pallet part 81 to the candidate color pallet part 83.

In the present embodiment, up to ten candidate colors can be designated as above on the candidate color pallet part 83. After finishing this process of selecting the desired candidate color with respect to the candidate color pallet part 83, the user 1 operates a "YES" button of the candidate color entry button 84. In this course, not all of the ten candidate colors need to be selected.

Figure 19:
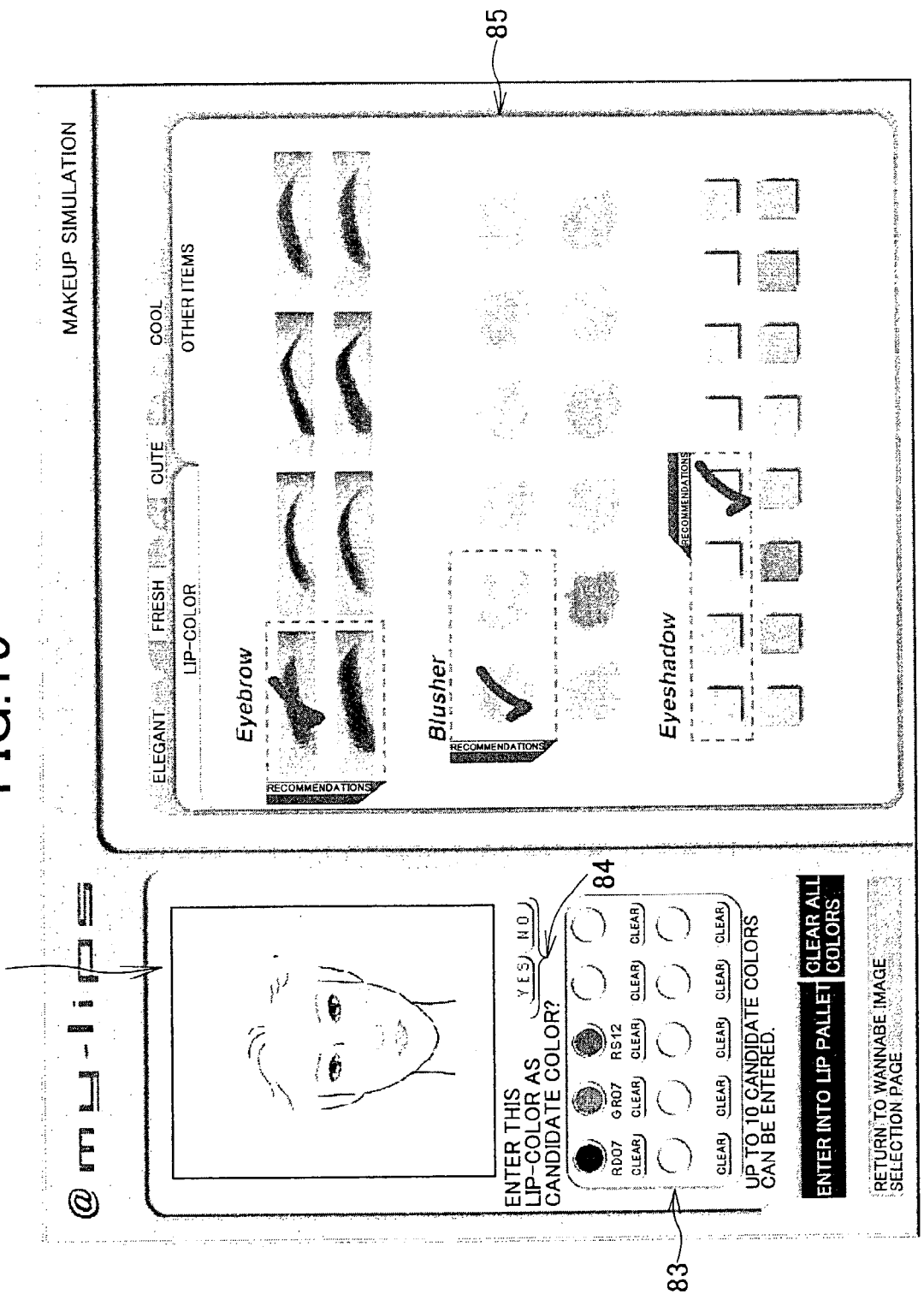
FIG. 19 is an illustration showing an example of an other-item makeup simulation screen.

On the other hand, when it is judged in step 106 that the other items are designated, the process proceeds to step 110. In step 110, an other-simulation screen is displayed on the CRT 12. FIG. 19 illustrates an example of the other-simulation screen.

In the present embodiment, various items of eyebrows, blushers, and eye shadows are set in an other-item pallet part 85. The user 1 designates desired items from these items. The designated items are reflected on the facial photograph of the user 1 displayed on the facial photograph display part 82 (step 111). In this course, the color of the lip-color in the lip-color makeup simulation screen is maintained.

Thus, the user 1 can judge in the simulation screen whether or not the lip-color of the designated color matches in a state where the designated items are applied. Accordingly, the user 1 can more surely select the lip-color of the color suitable to the desire of the user 1. This other-simulation screen is maintained until the lip-color makeup simulation screen is designated in step 106.

On the other hand, as mentioned above, after finishing the process of selecting the candidate color, and when the "YES" button of the candidate color entry button 84 is operated by the user 1, the process subjected to an affirmative judgment in step 109 proceeds to step 112. In step 112, pallets as receptacles for the lip-color are displayed on the CRT 12.

The user 1 selects a favorite pallet of the user 1 from these displayed various pallets, and inputs from the input device 11 (step 113). As described hereinafter, the lip-color of the color ordered by the user 1 is loaded into the pallet selected by the user 1 in step 115.

Figure 20:
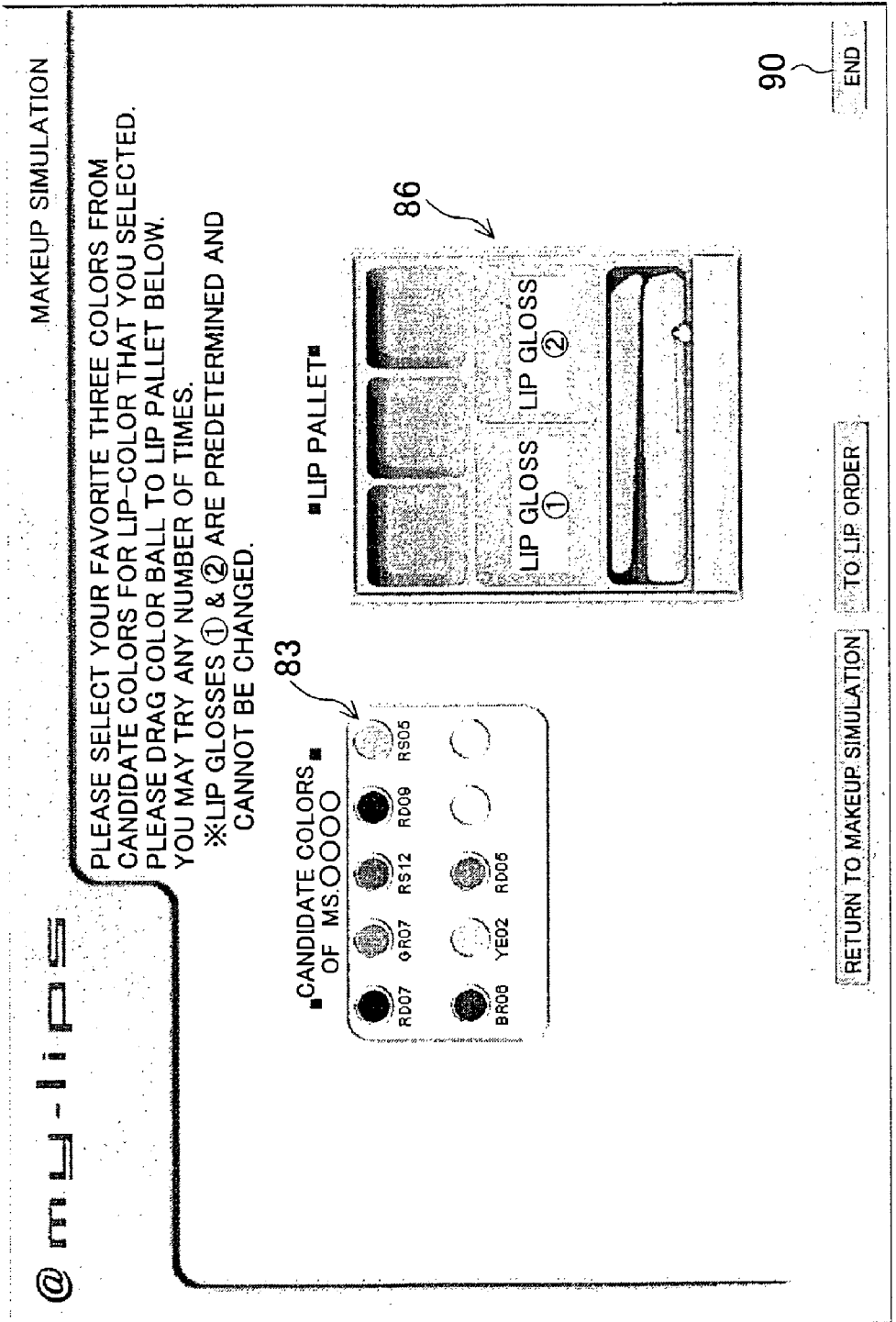
FIG. 20 is an illustration showing an example of a screen displaying a lip pallet before an order color is selected.

In subsequent step 114, a pallet screen is displayed. FIG. 20 illustrates an example of the pallet screen. A pallet 86 displayed here is the pallet selected in step 115. In the present embodiment, up to three lip-colors desired by the user 1 can be loaded into the pallet.

Additionally, in the pallet screen, not only the pallet 86, but also the candidate color pallet part 83 is displayed. The user 1 selects a color that the user 1 eventually orders (hereinafter referred to as order color) while looking at this pallet screen (step 115). This selecting process is performed from among the colors entered in the candidate color pallet part 83. Besides, this selecting process can be performed repeatedly any number of times until the user 1 can be satisfied.

Figure 21:
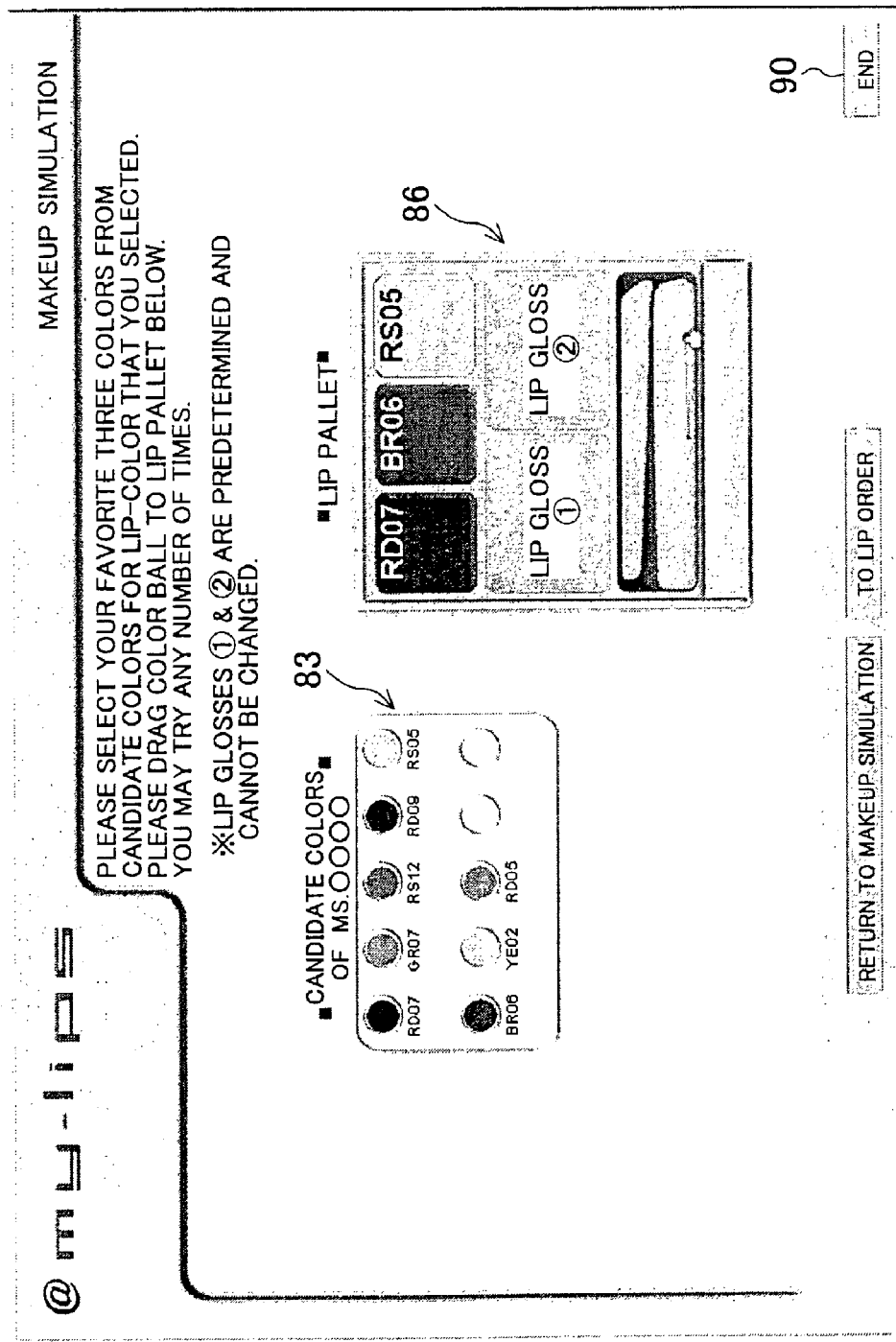
FIG. 21 is an illustration showing an example of a screen displaying the lip pallet where the order color is selected.

When the order color is selected in step 115, this order color is displayed on the pallet 86. FIG. 21 illustrates the pallet screen in a state where the order color is displayed. Upon finishing the eventual selecting process, the user 1 operates an end button 90 of the pallet screen illustrated in FIG. 20 and FIG. 21. The above-described processes of steps 112 to 116 are performed repeatedly until this end button 90 is operated.

On the other hand, when the end button 90 is operated, and an affirmative judgment is made in step 117, the process proceeds to step 118, in which an order sheet screen is displayed. FIG. 22 illustrates an example of the order sheet screen. The order sheet screen is provided with an original brand name entry space 92 and an address entry space 93.

As mentioned above, the user 1 can give an original brand name of the customer's own on the lip pallet 80 to be purchased. The original brand name entry space 92 is a space in which to enter this original brand name. The address entry space 93 is a space in which to enter an address to which to deliver the manufactured lip pallet 80.

Upon finishing entries in the spaces in the order sheet screen, the user 1 operates an order button 94. Thereby, an affirmative judgment is made in step 119, and the control device 64 transmits order information to the server 65. At this point, the order information is ① color information of the lip-colors of three colors selected by the user 1, ② pallet information selected by the user 1, ③ original brand name information, and ④ personal information of the user 1.

Figure 15:
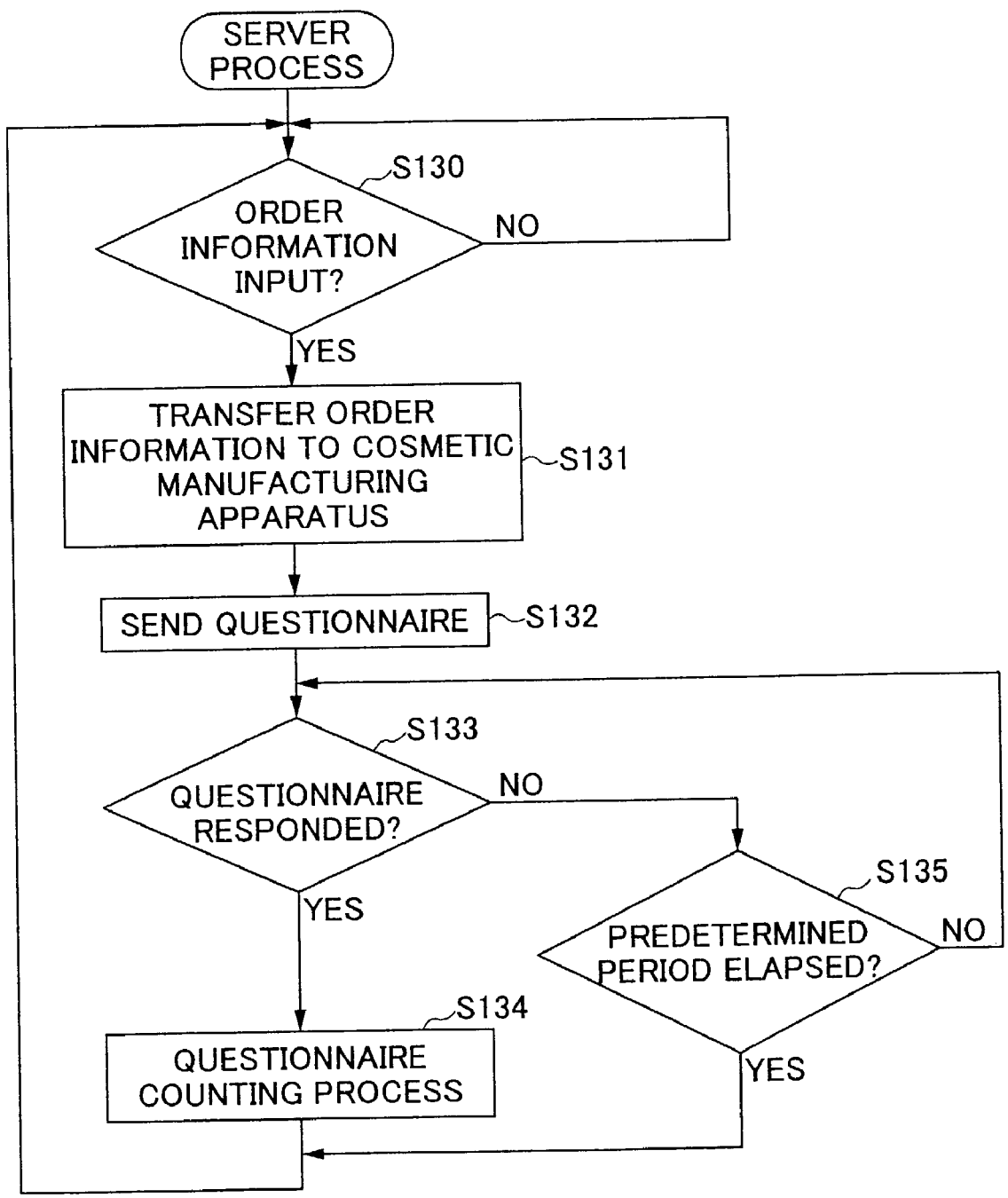
FIG. 15 is a flowchart of a process of a server in the cosmetic manufacturing system according to the second embodiment of the present invention.
Figure 16:
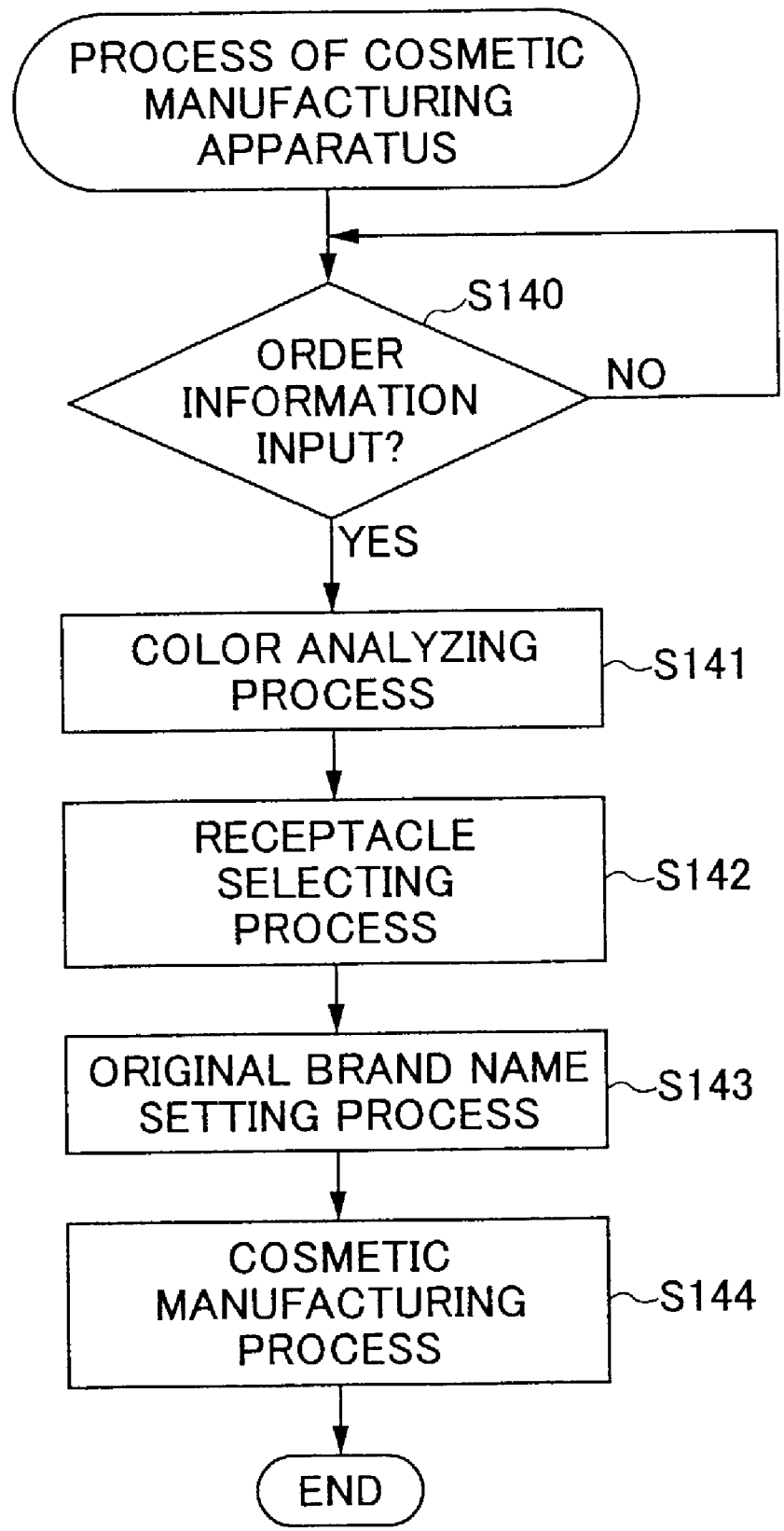
FIG. 16 is a flowchart of a process of a cosmetic manufacturing apparatus in the cosmetic manufacturing system according to the second embodiment of the present invention.

FIG. 15 shows a server process that the server 65 performs.

The server 65 monitors at all times whether or not the order information is transmitted from the user terminal 60, as indicated in step 130. Then, when it is recognized in step 130 that the order information is transmitted, the server 65 transfers this order information to the cosmetic manufacturing apparatus 70.

In subsequent step 132, a questionnaire is sent to the user terminal 60. Sending of this questionnaire is timed so as to be performed around a time when the lip pallet 80 manufactured by the cosmetic manufacturing apparatus 70 reaches the user 1, as described hereinafter.

In this course, contents of the questionnaire sent to the terminal 10 are stored in the second database 67. Then, the control device 31 identifies the user 1 according to the order information, and retrieves an e-mail address of this user 1 from the first database 66. Then, the control device 31 transmits the questionnaire read from the second database 67, to the retrieved e-mail address of this user 1. The specific contents of the questionnaire regard impressions and opinions on the present system, services and commodities expected to be developed anew, etc.

In step 133, it is judged whether or not the questionnaire is responded. Then, when it is judged that the questionnaire is responded, a counting process of the responded questionnaire is performed in step 134. This counted questionnaire count data is stored in the second database 67. When the foregoing processes are finished, the process returns to the above-mentioned step 130. Besides, this questionnaire count data stored in the second database 67 is used for developing new products, improving the system, etc.

On the other hand, when it is judged in step 133 that the questionnaire is not responded, and when it is judged in step 135 that a state of no response to the questionnaire has continued for a predetermined period, the process is returned to step 130 without performing the questionnaire counting process in step 134.

Subsequently, a description will be given of a cosmetic manufacturing process performed in the cosmetic manufacturing apparatus 70.

When the order information is transmitted from the user terminal 60 via the server 65 as mentioned above, this is detected in step 140 so that a manufacturing process of the lip pallet 80 is started.

In step 141, the color analysis unit 41 performs a color analysis according to the color information of the lip-colors of three colors selected by the user 1 included in the order information, and selects monochromatic materials for generating these three colors. Then, the lip-colors of the three colors (three types) desired by the user 1 are manufactured by performing processes, such as blending the selected monochromatic materials. The manufactured lip-colors are conveyed to the cosmetic manufacturing unit 42.

In step 142, according to the pallet information selected by the user 1 included in the order information, the receptacle selection unit 71 selects the pallet selected by the user 1 from the receptacle storage rack in which various pallets are stored, and conveys this to the original brand name formation unit 72.

In step 143, according to the original brand name information included in the order information, the original brand name formation unit 72 performs a process of forming the original brand name of the user 1 on the pallet selected in the receptacle selection unit 71. This process of forming the original brand name on the pallet may be constituted so that the original brand name is directly impressed on the pallet by using a laser device, or may be constituted so that the original brand name is printed on an ingredients label bonded on the back surface of the pallet.

The cosmetic manufacturing unit 42 loads the lip-colors manufactured in step 141 into the pallet given the original brand name manufactured by the processes of step 142 and step 143. Thereby, the lip pallet 80 having the lip-colors of the colors desired by the user 1, the pallet (the receptacle) desired by the user 1, and the original brand name desired by the user 1 is manufactured. The lip pallet 80 thus manufactured is delivered to the user 1 by using means for distribution not shown in the figures.

Besides, although the Internet is used as the communication network in each of the above-described embodiments, other communication networks can also be used.

In addition, although each of the above-described embodiments is described by taking a cosmetic as an example of the commodity, the application of the present invention is not limited to the cosmetic, and the present invention is also applicable to other commodities, such as a T-shirt.

As described above, according to the present invention, a customer can designate desired color data by inputting color specifying information without directly inputting desired color information. Additionally, it becomes possible to manufacture a commodity desired by a customer on a customer-by-customer basis so as to cope with diversification of customers' purchasing preferences.

Additionally, it becomes possible for a customer to purchase a commodity of a desired color by inputting commodity identification data as the color specifying information.

Additionally, the server can retrieve color data most suitable to skin information data input from a customer and present this to the customer. Accordingly, the customer can purchase a commodity of the customer's own most suitable to the face or the skin of the customer.

Additionally, a customer can input color information from any object which can be input by color inputting means; therefore, it becomes possible to meet diversified needs of customers for colors.

Additionally, a customer can select a color of a commodity by referring to a counting process result counted by counting means.

Additionally, a customer can see a commodity imitatively in a state of being colored so that the customer can surely select a color suitable to the customer's desire.

Additionally, with respect not only to a color of a commodity, but also to a receptacle housing the commodity, a customer can designate a desired receptacle by receptacle inputting means.

The present invention is not limited to the specifically disclosed embodiments, and variations and modifications are conceivable without departing from the claimed scope of the present invention.

The invention claimed is:

1. A personal color ordering system for manufacturing a cosmetic of a color selected by a customer by a cosmetic manufacturing apparatus according to information transmitted from a terminal via a communication network to a server, said server comprising:
   an information output part configured to send to the terminal in response to cosmetic information indicating the cosmetic selected by the customer, a selection screen which prompts the customer to select, by type, how a color of the cosmetic is to be decided, from a plurality of types; and
   an executing part configured to send to the terminal color information retrieved from a database in response to a selection of the type received from the terminal, said terminal comprising:
   a selecting part configured to select one of the plurality of types selected by the customer on the selection screen on a display device, and to send the selection of the type to the server;
   a first displaying part configured to display a plurality of colors used for manufacturing said cosmetic on the display device based on the color information received from the server;
   a color input part configured to input a candidate color selected by the customer from the plurality of colors displayed on the display device;
   a simulating part configured to perform a simulation display to display on the display device a screen which includes a face which is to be subjected to a makeup with said cosmetic, by coloring said cosmetic on the face with said candidate color input by said color input part;
   a transmitting part configured to transmit a designated color designated from said candidate colors by the customer to said cosmetic manufacturing apparatus via the server;
   a second displaying part configured to simultaneously display a plurality of different makeup images on the display device; and
   an image input part configured to input a makeup image selected by the customer from the plurality of makeup images simultaneously displayed on the display device,
   wherein said simulating part displays the face with the makeup image input by said image input part in the screen that is displayed on the display device.

2. The personal color ordering system as claimed in claim 1, wherein the plurality of makeup images include at least one of elegant, fresh, cute and cool.

3. The personal color ordering system as claimed in claim 1, wherein the screen further includes a first display pallet displaying the plurality of colors displayed by said first displaying part, and a second display pallet displaying the candidate color to input by said color input part.

4. The personal color ordering system as claimed in claim 1, wherein said first displaying part displays a plurality of colors used for manufacturing said cosmetic for the makeup image input by said image input part on the display device, said plurality of colors being displayed is changeable within a predetermined range.

5. A personal color ordering system for manufacturing a cosmetic of a color selected by a customer by a cosmetic manufacturing apparatus according to information transmitted from a terminal via a communication network to a server, said server comprising:
   an information output part configured to send to the terminal in response to cosmetic information indicating the cosmetic selected by the customer, a selection screen which prompts the customer to select, by type, how a color of the cosmetic is to be decided, from a plurality of types; and
   an executing part configured to send to the terminal color information retrieved from a database in response to a selection of the type received from the terminal, said terminal comprising;
   a selecting part configured to select one of the plurality of types selected by the customer on the selection screen on a display device, and to send the selection of the type to the server;
   a first displaying part configured to display a plurality of colors used for manufacturing said cosmetic on the display device based on the color information received from the server;
   a color input part configured to input a candidate color selected by the customer from the plurality of colors displayed on the display device;
   a simulating part configured to perform a simulation display to display on the display device a screen which includes a face which is to be subjected to a makeup with said cosmetic, by coloring said cosmetic on the face with said candidate color input by said color input part;

a transmitting part configured to transmit a designated color designated from said candidate colors by the customer to said cosmetic manufacturing apparatus via the server;

wherein said information output part sends to the terminal a selection screen which prompts the customer to choose a type selected from the group consisting of a first type which decides the color based on an existing cosmetic that has the color and is identified by the customer, a second type which decides the color based on the color that is directly input by the customer, a third type which decides the color based on answers provided by the customer to a questionnaire, and a fourth type which decides the color based on skin information that represents conditions of a skin of the customer and input by the customer.

6. The color ordering system as claimed in claim 5, wherein the terminal further comprises:

a second displaying part configured to simultaneously display a plurality of different makeup images on the display device;

an image input part configured to input a makeup image selected by the customer from the plurality of makeup images simultaneously displayed on the display device, wherein said simulating part displays the face with the makeup image input by said image input part in the screen that is displayed on the display device.

* * * * *